(12) United States Patent
Guertin et al.

(10) Patent No.: US 6,399,010 B1
(45) Date of Patent: Jun. 4, 2002

(54) METHOD AND APPARATUS FOR STEREOLITHOGRAPHICALLY FORMING THREE DIMENSIONAL OBJECTS WITH REDUCED DISTORTION

(75) Inventors: Michelle D. Guertin, Valencia; Charles W. Hull, Santa Clarita; Hop D. Nguyen, Quartz Hill, all of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/246,504

(22) Filed: Feb. 8, 1999

(51) Int. Cl.$^7$ .................... B29C 35/08; B29C 41/02; G06F 17/50; G06F 19/00
(52) U.S. Cl. .................. 264/401; 264/308; 264/497; 425/135; 425/174.4; 425/375; 700/119; 700/120
(58) Field of Search ............... 264/308, 401, 264/497; 425/135, 174.4, 375; 700/119, 120

(56) References Cited

U.S. PATENT DOCUMENTS

| | | | |
|---|---|---|---|
| 4,575,330 A | 3/1986 | Hull | |
| 4,752,352 A | 6/1988 | Feygin | |
| 4,863,538 A | 9/1989 | Deckard | |

(List continued on next page.)

FOREIGN PATENT DOCUMENTS

| | | |
|---|---|---|
| EP | 250 121 | 12/1987 |
| JP | 63-145015 | 6/1988 |
| WO | 95/18009 | 7/1995 |
| WO | 95/29053 | 11/1995 |
| WO | 96/12607 | 5/1996 |
| WO | 96/12608 | 5/1996 |
| WO | 96/12609 | 5/1996 |
| WO | 96/12610 | 5/1996 |
| WO | 97/11835 | 4/1997 |
| WO | 98/51478 | 11/1998 |
| WO | 98/51479 | 11/1998 |

OTHER PUBLICATIONS

Jacobs, Paul F., Stereolithography and Other RP&M Technologies from Rapid Prototyping to Rapid Tooling, Society of Manufacturing Engineers, 1996.

Jacobs, Paul F., Rapid Prototyping & Manufacturing Fundamental of Stereolithography, Society of Manufacturing Engineers, 1992.

(List continued on next page.)

Primary Examiner—Leo B. Tentoni
(74) Attorney, Agent, or Firm—Ralph D'Alessandro; Laura Bishop

(57) ABSTRACT

A rapid prototyping and manufacturing (e.g. stereolithography) method and apparatus for making three-dimensional objects on a layer-by-layer basis by selectively exposing layers of material to prescribed synergistic stimulation including forming portions of a lamina using a first exposure, allowing a time delay, and then applying a second exposure. The time delay is sufficient to allow shrinkage of the material to occur that results from the first exposure. It is preferred that the solidified portion resulting from the first exposure does not adhere to the previously formed lamina. It is also preferred that the portion solidified by this first exposure does not adhere to any boundary region that may have been exposed and adhered to the previously formed lamina. The time delay associated with a given cross-sectional region may be occupied by exposing other cross-sectional regions. The delay may occur between two exposures of overlaying hatch or fill vectors. The delay may alternatively occur between exposure of hatch vectors and boundary vectors. The time delay may be determined by a clock, or alternatively, the time delay may be considered to have lapsed upon certain physical conditions being met, such as detecting the amount of shrinkage and determining that it has progressed far enough for the second exposure to occur.

21 Claims, 11 Drawing Sheets

U.S. PATENT DOCUMENTS

| | | |
|---|---|---|
| 4,945,032 A | 7/1990 | Murphy et al. |
| 4,999,143 A | 3/1991 | Hull et al. |
| 5,015,312 A | 5/1991 | Kinzie |
| 5,058,988 A | 10/1991 | Spence |
| 5,059,021 A | 10/1991 | Spence et al. |
| 5,076,974 A | 12/1991 | Modrek et al. |
| 5,104,592 A | 4/1992 | Hull et al. |
| 5,121,329 A | 6/1992 | Crump |
| 5,123,734 A | 6/1992 | Spence et al. |
| 5,133,987 A | 7/1992 | Spence et al. |
| 5,174,931 A | 12/1992 | Almquist et al. |
| 5,182,056 A | 1/1993 | Spence et al. |
| 5,182,715 A | 1/1993 | Vorgitch et al. |
| 5,184,307 A | 2/1993 | Hull et al. |
| 5,204,055 A | 4/1993 | Sachs et al. |
| 5,209,878 A | 5/1993 | Smalley et al. |
| 5,234,636 A | 8/1993 | Hull et al. |
| 5,238,639 A | 8/1993 | Vinson et al. |
| 5,256,340 A | 10/1993 | Allison et al. |
| 5,273,691 A * | 12/1993 | Hull et al. .................. 264/401 |
| 5,321,622 A | 6/1994 | Snead et al. |
| 5,429,908 A * | 7/1995 | Hokuf et al. ........... 264/401 X |
| 5,597,520 A | 1/1997 | Smalley et al. |
| 5,840,239 A | 11/1998 | Partanen et al. |
| 5,902,537 A | 5/1999 | Almquist et al. |
| 5,902,538 A | 5/1999 | Kruger et al. |
| 5,965,079 A | 10/1999 | Manners |

OTHER PUBLICATIONS

U.S. Patent Application No. 08/855,125, filed May 13, 1997, Nguyen et al., (now USP 6,084,980).

U.S. Patent Application No. 09/154,967, filed Sep. 17, 1998, Nguyen et al., (now abandond).

U.S. Patent Application No. 09/248,352, filed Feb. 8, 1999, Manners et al.

U.S. Patent Application No. 09/248,351, filed Feb. 8, 1999, Nguyen et al., (now USP 6,103,176).

U.S. Patent Application No. 09/246,416, filed Feb. 8, 1999, Bishop et al., (now USP 6,261,077).

U.S. Patent Application No. 09/484,984, filed Jan. 18, 2000, Earl et al.

U.S. Patent Application No. 09/247,114, filed Feb. 8, 1999, Beers et al., (now USP 6,132,667).

U.S. Patent Application No. 09/247,113, filed Feb. 8, 1999, Chari et al., (now USP 6,153,142).

U.S. Patent Application No. 09/247,120, filed Feb. 8, 1999, Everett et al., (now USP 6,241,934).

U.S. Patent Application No. 09/247,119, filed Feb. 8, 1999, Kulkarni et al., (now USP 6,159,411).

* cited by examiner

FIG. 2
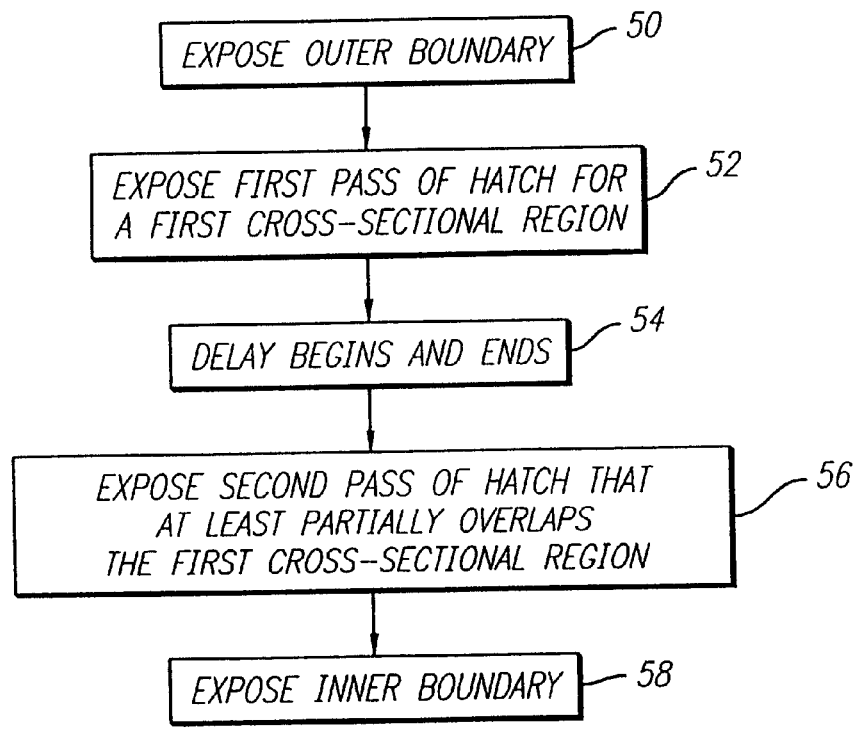
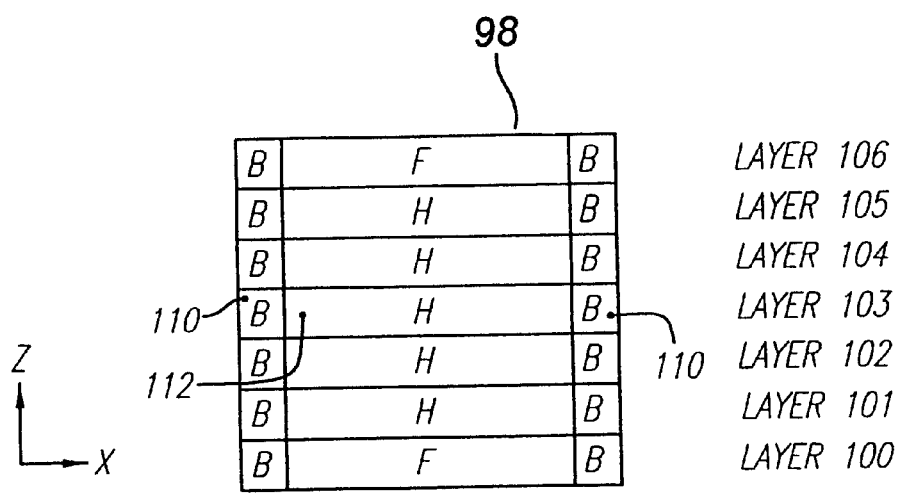
FIG. 3

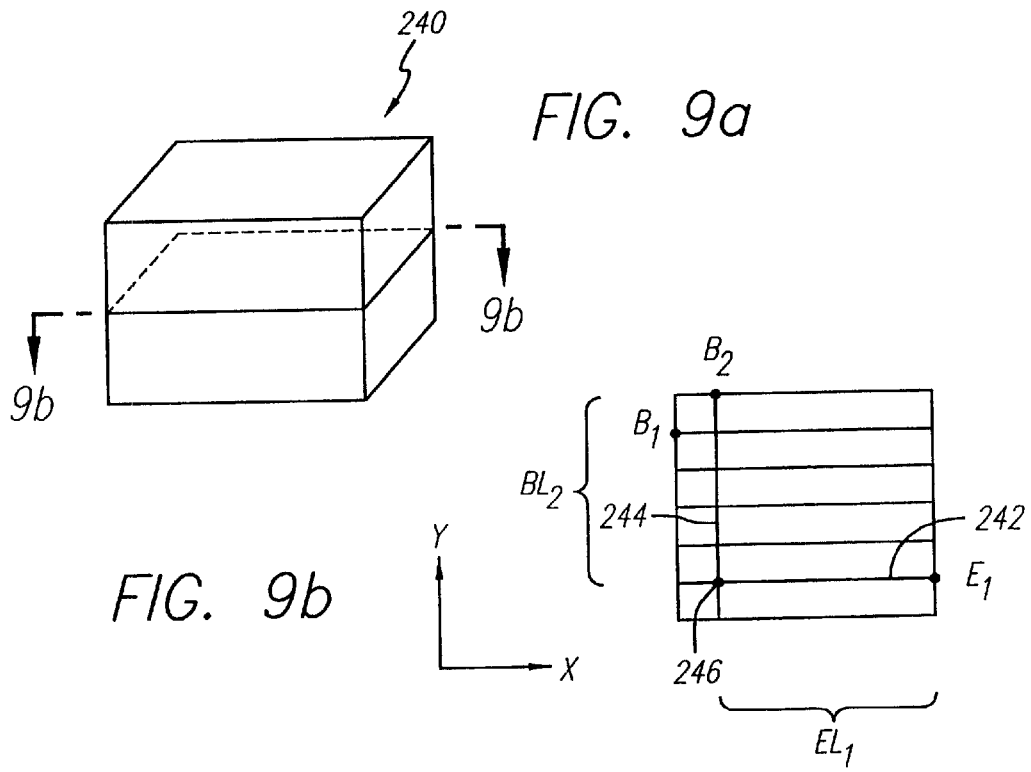
FIG. 9a
FIG. 9b
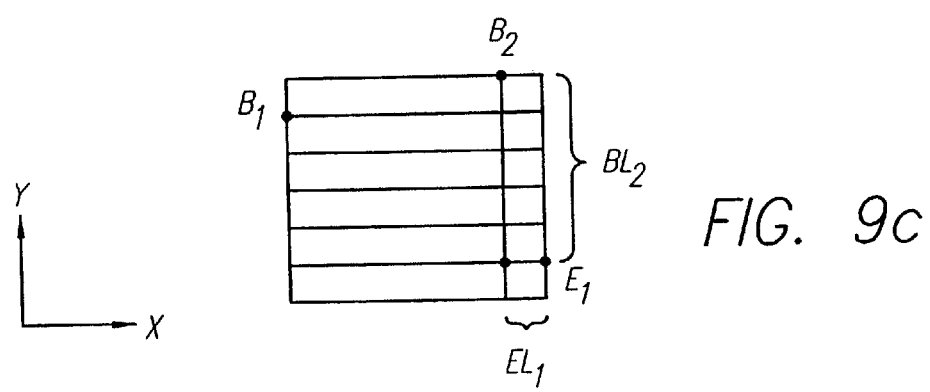
FIG. 9c
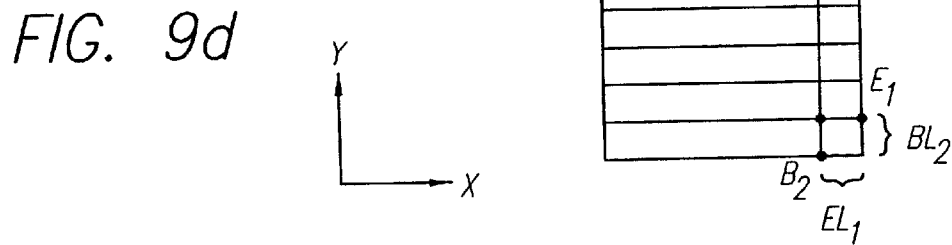
FIG. 9d

FIG. 10c
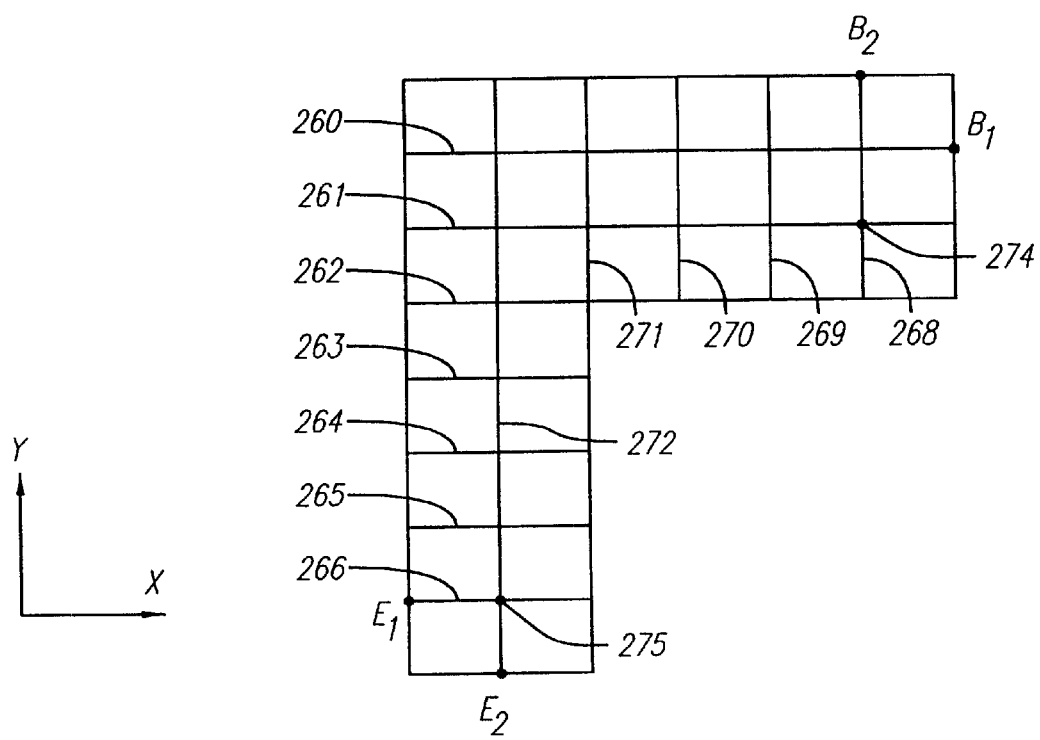
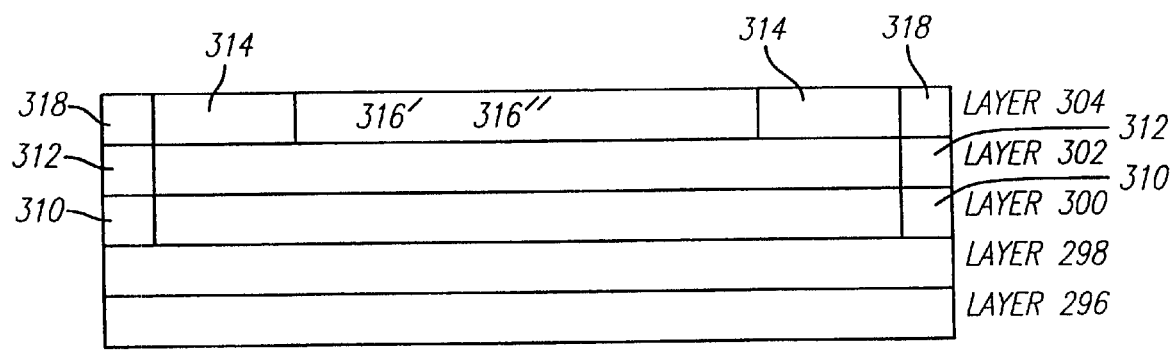
FIG. 11

METHOD AND APPARATUS FOR STEREOLITHOGRAPHICALLY FORMING THREE DIMENSIONAL OBJECTS WITH REDUCED DISTORTION

FIELD OF THE INVENTION

This invention relates to improved formation of three-dimensional objects from a fluid-like medium on a substantially layer-by-layer basis. The invention more particularly relates to the improved formation of three-dimensional objects by stereolithography utilizing techniques to overcome difficulties in quickly forming objects with minimized distortion.

BACKGROUND OF THE INVENTION

1. Related Art

Rapid Prototyping and Manufacturing (RP&M) is the name given to a field of technologies that can be used to form three-dimensional objects rapidly and automatically from three-dimensional computer data representing the objects. Rapid prototyping and manufacturing can be considered to include three classes of technologies: (1) stereolithography, (2) selective deposition modeling, and (3) laminated object manufacturing.

The stereolithography class of technologies creates three-dimensional objects by successively forming layers of a fluid-like medium adjacent to previously formed layers of medium and selectively solidifying these layers to form and adhere laminae (i.e. solidified layers). These laminae are solidified according to cross-sectional data representing successive slices of the three-dimensional object. Typically, adhesion between successive laminae occurs by chemical bond formation between the two laminae (e.g. inter-lamina cross-linking) during polymerization. In alternative embodiments, it is possible that adhesion could occur by application of a separate adhesive or by other mechanical bonding. In summary, adhesion may occur via an adhesive or cohesive phenomenon.

One specific stereolithography technology is known simply as stereolithography, and it uses a liquid medium that is selectively solidified by exposing it to stimulation. The liquid medium is typically a photopolymerizable material (i.e. resin) and the stimulation is typically visible or ultraviolet electromagnetic radiation. The radiation is typically produced by a laser. Liquid-based stereolithography is disclosed in various patents, applications, and publications, of which a number are briefly described in the Related Patents, Applications and Publications section hereinafter. Another stereolithography technology is known as selective laser sintering (SLS). Selective laser sintering is based on the selective solidification of layers of a powdered medium by exposing the layers to infrared electromagnetic radiation to sinter or fuse the particles. Selective laser sintering is described in U.S. Pat. No. 4,863,538 issued Sep. 5, 1989, to Deckard. A third technology is known as three-dimensional printing (3DP). Three-dimensional printing is based on the selective solidification of layers of a powdered medium which are solidified by the selective deposition of a binder thereon. Three-dimensional printing is described in U.S. Pat. No. 5,204,055 issued Apr. 20, 1993, to Sachs, et al.

The present invention is primarily directed to stereolithography using liquid-based building materials (i.e. medium). It is believed, in addition, that the techniques of the present invention may have application in the other stereolithography technologies for the purposes of reducing distortion and/or speeding object formation.

Selective deposition modeling (SDM) involves the build-up of three-dimensional objects by selectively depositing solidifiable material on a lamina-by-lamina basis according to cross-sectional data representing slices of the three-dimensional object. One such technique is called fused deposition modeling (FDM) and involves the extrusion of streams of heated, flowable material which solidify as they are dispensed onto the previously formed laminae of the object. Fused deposition modeling is described in U.S. Pat. No. 5,121,329 issued Jun. 9, 1992, to Crump. Another technique is called ballistic particle manufacturing (BPM) which uses a 5-axis, ink-jet dispenser to direct particles of a material onto previously solidified layers of the object. Ballistic particle manufacturing is described in PCT Publication Nos. WO 96/12607 published May 2, 1996, by Brown, et al.; WO 96/12608 published May 2, 1996, by Brown et al.; WO 96/12609 published May 2, 1996, by Menhennett et al.; and WO 96/12610 published May 2, 1996, by Menhennett et al. A third technique called multijet modeling (MJM) involves the selective deposition of droplets of material from multiple ink jet orifices to speed the building process. Multijet modeling is described in PCT Publication Nos. WO 97/11835 published Apr. 3, 1997, by Earl et al.; and, WO 97/11837 published Apr. 3, 1997, by Leyden et al. (both assigned to 3D Systems, Inc., as is the instant application).

Laminated object manufacturing (LOM) techniques involve the formation of three-dimensional objects by the stacking, adhering, and selective cutting, in a selected order, of sheets of material, according to the cross-sectional data representing the three-dimensional object to be formed. Laminated object manufacturing is described in U.S. Pat. No. 4,752,352 issued Jun. 21, 1988, to Feygin; and U.S. Pat. No. 5,015,312 issued May 14, 1991, to Kinzie; and in PCT Publication WO 95/18009 published Jul. 6, 1995, by Morita et al.

As noted above, the techniques of the instant invention are directed primarily to liquid-based stereolithography object formation. However, it is believed that the techniques may be applied in the selective deposition modeling technologies to reduce object distortion and/or to decrease object formation time. Some of the selective deposition modeling technologies may use a technique sometimes referred to as "Minimum Layer Seconds". This technique requires that a minimum amount of time lapse from the beginning of building one layer to the beginning of building the next layer, so that there is sufficient time for heat built up in the layer to dissipate. If a layer takes less than the Minimum Layer Seconds to build, the balance of the Minimum Layer Seconds is counted down before beginning the next layer. If a delay occurs, it occurs after the layer is completely built. This technique does not teach or suggest the partial creation of a lamina, then a delay, then the completion of the lamina.

Various techniques for decreasing distortion, and techniques that utilize multiple exposures of an ultraviolet-curable fluid during creation of three-dimensional objects formed using stereolithography, have been described previously, such as, for example: (1) U.S. Pat. No. 5,104,592 issued Apr. 14, 1992, to Hull et al., (2) Japanese Laid Open Patent Application 63-145015A published Jun. 17, 1988, by Itarni et al., (3) U.S. Pat. No. 4,945,032 issued Jul. 31, 1990, to Murphy et al., (4) Appendix A of U.S. Pat. No. 4,575,330 issued Mar. 11, 1986, to Hull, (5) European Patent 0 250 121 B1 issued Nov. 2, 1994, to Pornerantz et al., and (6) U.S. Pat. No. 5,965,079 to Gigi et al. assigned to 3D Systems, Inc.

U.S. Pat. No. 5,104,592 issued Apr. 14, 1992, to Hull et al., discloses various stereolithography techniques for reducing curl distortion. The first curl reduction technique disclosed is the "dashed line" technique, in which a stereolithography line that is part of a vertical or horizontal formation is drawn with breaks in the line instead of a solid line. Thus, the pulling force normally transmitted along the vector is reduced, and the curl effect is reduced. The second curl reduction technique is the "bent-line" technique, in which a stereolithography line that is part of a vertical or horizontal formation is drawn with bends in the line instead of a straight line. In this way, the pulling force normally transmitted along the vector is reduced, and the curl effect is reduced. The third curl reduction technique is the "secondary structure" technique, in which a stereolithography line which is part of a vertical or horizontal formation is drawn so that it does not adhere directly to the line below or beside it, but is attached, after it is formed, with a secondary structure. As such, the pulling force down the vector is eliminated, the bending moment on adjacent lines is reduced, and the curl effect is reduced.

One type of secondary structure is known as "rivets" and comprises supporting lines of lower exposure and an area of higher exposure (a "rivet") for connecting support lines from adjacent layers together. The fourth curl reduction technique is the "multi-pass" technique, in which a stereolithography line which is part of a vertical or horizontal formation is drawn so that it does not adhere directly to the line below or beside it until the material is substantially reacted. In this way, the pulling force down the vector is reduced, the structure is more rigid so it can resist deformation, and the curl effect is reduced. This reference fails to teach a step of ensuring enough time has passed after exposure of a first set of vectors for the shrinkage rate to decline to an acceptable level, prior to exposure of a second set of vectors, let alone teaching the use of a device to count down a desired delay time.

Japanese Laid Open Patent Application 63-145015A published Jun. 17, 1988, by Itami et al. discloses stereolithography techniques to address inadequate hardness resulting from the small degree of radical polymerization during hardening, and which result in the product being deformed under its own weight. The techniques disclosed irradiate the same position on the liquid photopolymerizable resin material several times at specified time intervals using identical raster exposures. First, a layer of liquid is added to a container (i.e. vat). Then the liquid is irradiated with light which is raster scanned in the "main scanning direction" while moving in the "subscanning direction" in order to partially harden the liquid. The same positions of the resin are raster scanned again at a specified time interval, by raster scanning in the same "main scanning direction" as for the first pass, while moving in the same "subscanning direction" as for the first pass. For each position of the resin, the time interval between the first and second irradiation is the same. The main scanning direction is the direction in which the raster lines cured by the laser beam are situated, and the subscanning direction is the direction in which these raster lines propagate as they are cured next to each other, and is perpendicular to the main scanning direction. The laser beam movement in the main scanning direction is accomplished with the beam reflecting off of a revolving polygon mirror, and the laser beam movement in the subscanning direction is accomplished by either moving the liquid container in the subscanning direction or by reflecting the beam off of a rotating flat mirror. This reference fails to teach curing lines in one direction for a first pass and curing lines in a different direction for a second pass. In addition, this reference fails to teach a step of ensuring enough time has passed after exposure of a first set of vectors for the shrinkage rate to decline to an acceptable level, prior to exposure of a second set of vectors in a different direction than the direction of the first set of vectors, let alone teaching the use of a device to count down a desired delay time.

U.S. Pat. No. 4,945,032 issued Jul. 31, 1990, to Murphy et al. discloses stereolithography techniques that provide increased strength and solvent resistance of the formed object so distortion is minimized. In preferred practice, these techniques are carried out as a series of repeated, rapid scans of the ultraviolet-curable liquid surface by a computer directed laser light source in the production of each surface layer. This reference fails to teach a step of ensuring enough time has passed after exposure of a first set of vectors for the shrinkage rate to decline to an acceptable level, prior to exposure of a second set of vectors, let alone teaching the use of a device to count down a desired delay time.

U.S. Pat. No. 4,575,330 issued Mar. 11, 1986, to Hull discloses general stereolithography techniques for generating a three-dimensional object. In the appendix of this patent, multiple irradiation passes are used for forming laminae. There is no mention anywhere in this reference the purpose of the multiple passes nor does there appear to be an intentional delay between irradiation passes. This reference fails to teach the utility of ensuring enough time has passed after exposure of a first set of vectors for the shrinkage rate to decline to an acceptable level, prior to exposure of a second set of vectors, let alone teaching the use of a clock to count down a delay time.

European Patent 0 250 121 B1 issued Nov. 2, 1994, to Pomerantz et al. discloses a Stereolithography technique for controlling spatial distortion due to shrinkage of the solidifiable material upon solidification. This technique teaches that radiation of the liquid layer is carried out such that as shrinkage occurs, additional solidifiable liquid tends to move into the region vacated by the shrinkage and is solidified. This patent also discloses a Stereolithography technique for reducing the effects of shrinkage. This technique teaches that radiation of the liquid layer may be applied through masks in a two or more step checkerboard pattern to restrict shrinkage at any given time to localized areas, whereby the distortions due to shrinkage following the first step are at least partially compensated during solidification from a subsequent step. This reference fails to teach lack of adhesion on a first pass where adhesion occurs on a subsequent pass. In addition, this reference fails to teach a step of ensuring enough time has passed after exposure of a first set of vectors for the shrinkage rate to decline to an acceptable level, prior to exposure of a second set of overlapping vectors, let alone teaching the use of a device to count down a desired delay time.

U.S. Pat. No. 5,965,079 to Gigl et al. discloses various Stereolithography techniques for increasing structural integrity while reducing the need for post-curing; for obtaining uniform exposure in regions of intersecting vectors of different types; for determining cure depth; and for reducing distortion due to shrinkage, curl, and post cure.

In U.S. Pat. No. 5,965,079, a stereolithography technique named "tiling" is described. Tiling is a method of forming a lamina of an object produced by stereolithography, wherein the lamina is divided into a series of area elements or tiles. Each area element is isolated from adjacent area elements by spacings. The spacings around each area element remain untransformed, at least until all neighboring area elements or tiles are transformed or solidified. The spacings between the individual tiles are left untransformed to act as stess relief zones. The width of the spacing is typically small compared to the width of the individual tiles.

U.S. Pat. No. 5,965,079 discloses that it has long been suspected and recently experimentally verified that shrinkage of curing material can still be occurring several seconds after exposure of an area is suspended. The application states that, as the building material is cured, using preferred materials (XB 5081), there is a delay of approximately 2–3 seconds prior to shrinkage of the material. Thus, the application suggests that the grouping between the tiles is cured after the tiles have been allowed to shrink (e.g., generally at least a 3-second delay between completing neighboring tiles and beginning to grout). In addition, it teaches that the tiles can be partially cured (e.g., a one line trace) followed by partial curing of other tiles, and then returning one or more times to fully cure the previously partially cured tiles.

Another embodiment of U.S. Pat. No. 5,965,079 forms a lamina on which the gaps will be closed by floating at least one end of the solidified material which spans the gap until after at least a substantial portion of the shrinkage has occurred. After allowing for shrinkage to occur, the floating end(s) can be tacked down with rivets, or multipass, or the like.

It is also taught in U.S. Pat. No. 5,965,079 that long vectors can cause tremendous amounts of curl if they are cured and adhered to a previous layer while they are still shrinking. In the case of a floating vector, it may occur where the ends of the vector attach to a boundary. A distortion reduction technique called "ACES" is described. Using ACES, the first set of skin vectors exposed is given an exposure that results in a net cure depth of slightly under one layer thickness. When the second set of vectors expose the material, the increase in cure depth results in adhesion. When using epoxy resins like SL 5170 and SL 5180, it has been found helpful to allow a time period of between 5 and 90 seconds after exposure of each cross-section before beginning the recoating process so as to allow the modulus of the exposed resin to increase to a certain minimum level before subjecting the newly exposed layer to the forces involved in recoating. This time period is called "predip delay". As a technique for eliminating or at least minimizing the impact that predip delay has on part building time, it is possible to use a smart exposure pattern that exposes critical areas first, followed by exposure of less critical areas. In effect, the count down of the predip delay time can begin as soon as all critical regions have been exposed.

Another distortion reduction technique disclosed is called "log jam". "Log Jam" refers to a scanning technique where some internal hatch (or fill) vectors are retracted from the layer borders to avoid adhesion, wherein after exposure of the hatch or fill an offset border or the like is scanned to attach the hatch and original border.

This reference fails to teach the utility of ensuring enough time has passed after exposure of a first set of vectors for the shrinkage rate to decline to an acceptable level, prior to exposure of a second set of perpendicularly overlapping vectors, let alone teaching the use of a clock to count down a delay time between exposures of perpendicularly overlapping vectors on one layer.

All publications, applications and patents referred to in this section are hereby incorporated by reference as if set forth in full.

A need exists in the art for simplified techniques that can be used to rapidly form objects with less distortion than previously possible, and more particularly, with less distortion than was reliably allowed when using high scan rates for solidifying the material.

2. Other Related Patents, Applications and Publications

The patents, applications and publications in the following Table 1 are hereby incorporated by reference as if set forth in full. Table 1 provides a table of patents and applications co-owned by the assignee of the instant application. A brief description of subject matter found in each patent, application and publication is included in the table to aid the reader in finding specific types of teachings. It is not intended that the incorporation of subject matter be limited to those topics specifically indicated, but instead the incorporation is to include all subject matter found in these publications, applications and patents. The teachings in these incorporated references can be combined with the teachings of the instant application in many ways. For example, the references directed to various data manipulation techniques may be combined with the teachings herein to derive even more useful, modified object data that can be used to more accurately and/or efficiently form objects. As another example, the various apparatus configurations disclosed in these references may be used in conjunction with the novel features of the instant invention.

TABLE 1

Related Patents, Applications and Publications

| Patent/Application/Publication No. | Inventor | Subject |
|---|---|---|
| U.S. Pat. No. 4,575,330 | Hull | Discloses fundamental elements of stereolithography. |
| U.S. Pat. No. 4,999,143 | Hull, et al. | Discloses various removable support structures applicable to stereolithography. |
| U.S. Pat. No. 5,058,988 | Spence | Discloses the application of beam profiling techniques useful in stereolithography for determining cure depth, scanning velocity, etc. |
| U.S. Pat. No. 5,059,021 | Spence, et al. | Discloses the utilization of drift correction techniques for eliminating errors in beam positioning resulting from instabilities in the beam scanning system. |
| U.S. Pat. No. 5,076,974 | Modrek, et al. | Discloses techniques for post processing objects formed by stereolithography. In particular exposure techniques are described that complete the solidification of the building material. Other post processing steps are also disclosed such as steps of filling in or sanding off surface discontinuities. |

TABLE 1-continued

Related Patents, Applications and Publications

| Patent/Application/Publication No. | Inventor | Subject |
|---|---|---|
| U.S. Pat. No. 5,104,592 | Hull | Discloses various techniques for reducing distortion, and particularly curl type distortion, in objects being formed by stereolithography. |
| U.S. Pat. No. 5,123,734 | Spence, et al. | Discloses techniques for calibrating a scanning system. In particular, techniques for mapping from rotational mirror coordinates to planar target surface coordinates are disclosed. |
| U.S. Pat. No. 5,133,987 | Spence, et al. | Discloses the use of a stationary mirror located on an optical path between the scanning mirrors and the target surface to fold the optical path in a stereolithography system. |
| U.S. Pat. No. 5,174,931 | Almquist, et al. | Discloses various doctor blade configurations for use in forming coatings of medium adjacent to previously solidified laminae. |
| U.S. Pat. No. 5,182,056 | Spence, et al. | Discloses the use of multiple wavelengths in the exposure of a stereolithographic medium. |
| U.S. Pat. No. 5,182,715 | Vorgitch, et al. | Discloses various elements of a large stereolithographic system. |
| U.S. Pat. No. 5,184,307 from application No. 07/331,644 | Hull, et al. | Discloses a program called Slice and various techniques for converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| U.S. Pat. No. 5,209,878 | Smalley, et al. | Discloses various techniques for reducing surface discontinuities between successive cross-sections resulting from a layer-by-layer building technique. Disclosed techniques include use of fill layers and meniscus smoothing. |
| U.S. Pat. No. 5,234,636 | Hull, et al. | Discloses techniques for reducing surface discontinuities by coating a formed object with a material, heating the material to cause it to become flowable, and allowing surface tension to smooth the coating over the object surface. |
| U.S. Pat. No. 5,238,639 | Vinson, et al. | Discloses a technique for minimizing curl distortion by balancing upward curl to downward curl. |
| U.S. Pat. No. 5,256,340 and WO 95/29053 | Allison, et al. | Discloses various build/exposure styles for forming objects including various techniques for reducing object distortion. Disclosed techniques include: (1) building hollow, partially hollow, and solid objects, (2) achieving more uniform cure depth, (3) exposing layers as a series of separated tiles or bullets, (4) using alternate sequencing exposure patterns from layer to layer, (5) using staggered or offset vectors from layer to layer, and (6) using one or more overlapping exposure patterns per layer. |
| U.S. Pat. No. 5,321,622 | Snead, et al. | Discloses a computer program known as CSlice which is used to convert three-dimensional object data into cross-sectional data. Disclosed techniques include the use of various Boolean operations in stereolithography. |
| U.S. Pat. No. 5,597,520 and WO 95/29053 | Smalley, et al. | Discloses various exposure techniques for enhancing object formation accuracy. Disclosed techniques address formation of high resolution objects from building materials that have a Minimum Solidification Depth greater than one layer thickness and/or a Minimum Recoating Depth greater than the desired object resolution. |
| WO 97/11835 | Thayer, et al. | Discloses build and support styles for use in a Multi-Jet Modeling selective deposition modeling system. |
| WO 97/11837 | Earl, et al. | Discloses data manipulation and system control techniques for use in a Multi-Jet Modeling selective deposition modeling system. |
| U.S. Pat. No. 5,902,537 | Almquist, et al. | Discloses various recoating techniques for use in stereolithography, including 1) an ink jet dispensing device, 2) a fling recoater, 3) a vacuum applicator, 4) a stream recoater, 5) a counter rotating roller recoater, and 6) a technique for deriving sweep extents. |
| U.S. Pat. No. 5,840,239 | Partanen, et al. | Discloses the use of a pulsed radiation source for solidifying layers of building material and in particular the ability to limit pulse firing locations to only selected target locations on a surface of the medium. |
| U.S. Pat. No. 6,084,980 | Nguyen, et al. | Discloses techniques for interpolating originally supplied cross-sectional data descriptive of a three-dimensional object to produce modified data descriptive of the three-dimensional object including data descriptive of intermediate regions between the originally supplied cross-sections of data. |
| WO 98/51479 | Manners, et al. | Discloses techniques for identifying features of partially formed objects. Identifiable features include trapped volumes, effective trapped volumes, and solid features of a specified |

TABLE 1-continued

Related Patents, Applications and Publications

| Patent/Application/Publication No. | Inventor | Subject |
|---|---|---|
| | | size. The identified regions can be used in automatically specifying recoating parameters and or exposure parameters. |
| U.S. Pat. No. 5,902,538 | Kruger, et al. | Discloses simplifies techniques for forming high resolution three dimensional objects from materials possessing a minimum recoating depth (MRD) that is larger than a layer thickness resolution desired in forming objects. Building techniques include enhanced exposure and recoating techniques, with layers defined as primary or secondary. Recoating techniques are described which can be used when the thickness between consecutive layers is less than a leading edge bulge phenomenon. |
| U.S. Pat. No. 09/154,967 now abandoned | Nguyen, et al. | Discloses techniques for stereolithographic recoating using a sweeping recoating device that pause and/or slows down over laminae that are being coated over. |
| 09/245,352, filed concurrently | Manners, et al. | Discloses stereolithographic techniques for forming objects using multiple sized beams including data manipulation techniques for determining which portions of lamina may be formed with a larger beam and which should be formed using a smaller beam. |
| 6,103,176 | Nguyen, et al. | Discloses improved techniques for managing recoating parameters when forming objects using layer thicknesses smaller than a minimum recoating depth (MRD) and treating some non-consecutive layers as primary layers and treating intermediate layers there between as secondary layers. |
| 6,261,077 | Bishop, et al. | Discloses an improved Stereolithographic apparatus structure for isolating vibration and/or extraneous heat producing components from other thermal and vibration sensitive components. |
| 09/484,984 | Earl, et al. | Discloses techniques for forming objects while compensating for solidification width induced in a building material by a beam of prescribed stimulation. |
| 6,132,667 | Beers, et al. | Discloses improved stereolithographic techniques for ensuring scan speeds and laser power settings are appropriate for accurately and rapidly exposing layers of material. |
| 6,153,142 | Chari, et al. | Discloses improved stereolithographic techniques for maintaining build chamber temperature at a desired level. The techniques include varying heat production based on the difference between a detected temperature and the desired temperature. |
| 6,241,934 | Everett, et al. | Discloses techniques forming objects using varying production of prescribed stimulation (e.g. UV radiation). Production is reduced or eliminated during non-exposure periods (e.g. recoating, z-wait, and pre-dip delay). Production is set to a desired level based on the type of exposure that is desired. |
| 6,159,411 | Kulkarni, et al. | Discloses techniques for forming objects using a simplified data preparation process. Selection of the various parameter styles needed to form an object is reduced to answering several questions from lists of possible choices. |
| 6,126,884 | Beers, et al. | Discloses techniques for forming objects by exposing a material to a beam of prescribed stimulation while accurately controlling exposure and positioning of the beam when under the control of vector data and when high speed scanning is desired. |

The following two books are also incorporated by reference herein as if set forth in full: (1) *Rapid Prototyping and Manufacturing: Fundamentals of Stereolithograyhy*, by Paul F. Jacobs; published by the Society of Manufacturing Engineers, Dearborn Mich.; 1992; and (2) *Stereolithography and other RP&M Technologies: from Rapid Prototyping to Rapid Tooling*; by Paul F. Jacobs; published by the Society of Manufacturing Engineers, Dearborn Mich.; 1996.

SUMMARY OF THE INVENTION

A first aspect of the invention is to provide a method of forming at least a portion of a three-dimensional object, including: a) forming a layer of fluid-like material over a previously formed lamina of the object, b) exposing the layer to stimulation to form a subsequent lamina of the object adhered to the previously formed lamina, c) repeating (a) and (b) to form the object from a plurality of adhered laminae, and d) defining a time period. Exposing the layer includes exposing at least one element of one layer with at least two exposures. A first exposure is followed by a second exposure after lapse substantially equal to or greater than the defined time period. The first exposure is performed by a beam scanning in a first direction over the element and the second exposure is performed by the beam scanning in a second direction over the element. The first and second directions are different.

A second aspect of the invention is to provide a method of forming at least a portion of a three-dimensional object including: a) forming a layer of fluid-like material over a previously formed lamina of the object, b) exposing the layer to stimulation to form a subsequent lamina of the object adhered to the previously formed lamina, c) repeating (a) and (b) to form the object from a plurality of adhered laminae, and d) defining a time period (DTP). At least one lamina to be formed includes at least first and second isolated regions. Exposing the layer includes exposing the layer with at least first and second exposures. A first exposure of the first region is completed at a time $CT_{11}$ and the first exposure of the second region is completed at a time $CT_{21}$ and a second exposure of the first region begins at a time $BT_{12}$ and the second exposure of the second region begins at a time $BT_{22}$ fulfilling the equations, DTP~$\leq BT_{12}$-$CT_{11}$, and DTP~$\leq BT_{22}$-$CT_{21}$, where $CT_{11}$, $CT_{21}$, $BT_{12}$, and $BT_{22}$ follow after one another respectively.

A third aspect of the invention is to provide a method for forming at least a portion of a three-dimensional object including: a) forming a layer of fluid-like material over a previously formed lamina of the object, b) exposing the layer to stimulation to form a subsequent lamina of the object adhered to the previously formed lamina, c) repeating (a) and (b) to form the object from a plurality of adhered laminae, and d) defining a time period. Exposing the layer includes exposing at least one element of one layer with at least two exposures. A first exposure is completed at a time $T_1$ and a second exposure begins at a time $T_2$ and the difference between $T_1$ and $T_2$ is substantially equal to or greater than the defined time period.

A fourth aspect of the invention is to provide a method for forming at least a portion of a three-dimensional object including: a) forming a layer of fluid-like material over a previously formed lamina of the object, b) exposing the layer to stimulation to form a subsequent lamina of the object adhered to the previously formed lamina, c) repeating (a) and (b) to form the object from a plurality of adhered laminae, and d) defining a time period. At least one lamina to be formed includes at least two regions and exposing the layer includes exposing the layer with at least two exposures. A first exposure exposes a first region and at least a second region, and the at least second exposure exposes a first region and at least second region. The time between the completion of the first exposure of at least one of the exposed regions and the beginning of the second exposure of the exposed region is substantially equal to or greater than the defined time period.

A fifth aspect of the invention is to provide a method for forming at least a portion of a three-dimensional object, including: a) forming a layer of fluid-like material over a previously formed lamina of the object, b) exposing the layer to stimulation to form a subsequent lamina of the object adhered to the previously formed lamina, c) repeating (a) and (b) to form the object from a plurality of adhered laminae, and d) defining a time period. Exposing the layer includes exposing at least one point of one layer with at least two exposures. A first exposure is followed by a second exposure after lapse of the defined tire period. The first exposure is performed by a beam scanning in a first direction over the element. The second exposure is performed by a beam scanning in a second direction over the element. The first and second directions are different, and at least one point receives a first exposure at a time T1, and a second exposure at a time $T_2$ according to the equation $T_2$-$T_1$~$\geq$DTP, wherein $T_1$ and $T_2$ follow one another consecutively.

A sixth aspect of the invention is to provide an apparatus for forming at least a portion of a three-dimensional object, including a) a coating system for forming a layer of fluid-like material over a previously formed lamina of the object, b) an exposure system for forming a subsequent lamina of the object adhered to the previously formed lamina, c) a computer programmed to operate (a) and (b) to form the object from a plurality of adhered laminae, and d) a computer programmed to utilize a defined time period. The exposure system is operated to form at least one element of one layer with at least two exposures. A first exposure is completed at a time $T_1$ and a second exposure begins at a time $T_2$ and the difference between $T_1$ and $T_2$ is substantially equal to or greater than the defined time period.

A seventh aspect of the invention is to provide an apparatus for forming at least a portion of a three-dimensional object, including a) means for forming a layer of fluid-like material over a previously formed lamina of the object, b) means for forming a subsequent lamina of the object adhered to the previously formed lamina, c) means for operating (a) and (b) to form the object from a plurality of adhered laminae, and d) means for defining a time period. The means for forming a subsequent lamina is operated to form at least one element of one layer with at least two exposures. A first exposure is completed at a time $T_1$ and a second exposure begins at a time $T_2$ and the difference between $T_1$ and $T_2$ is substantially equal to or greater then the defined time period. Other aspects of the invention supply apparatus for implementing the method aspects of the invention noted above.

Additional aspects of the invention will be clear from the embodiments of the invention described below, in conjunction with the Figures associated therewith. Further aspects of the invention involve those referenced above as well as other aspects, to be practiced alone and in various combinations with one another.

BRIEF DESCRIPTION OF THE DRAWINGS

FIG. 2 is a flow chart depicting the first embodiment.

FIG. 3 is side view of an object to be produced stereolithographically according to the teachings of the first embodiment.

FIG. 9*a* is an oblique view of a generally cube-shaped object to be produced stereolithographically.

FIGS. 9*b*, 9*c*, and 9*d* are section views taken along the line 9*b*—9*b* of FIG. 9*a*.

FIGS. 10*b* and 10*c* are section views taken along the line 10*b*—10*b* of FIG. 10*a*.

FIG. 11 is a side view of an object to be produced stereolithographically according to the teachings of the sixth embodiment.

DESCRIPTION OF PREFERRED EMBODIMENTS OF THE INVENTION

Introduction

Figure 1A:
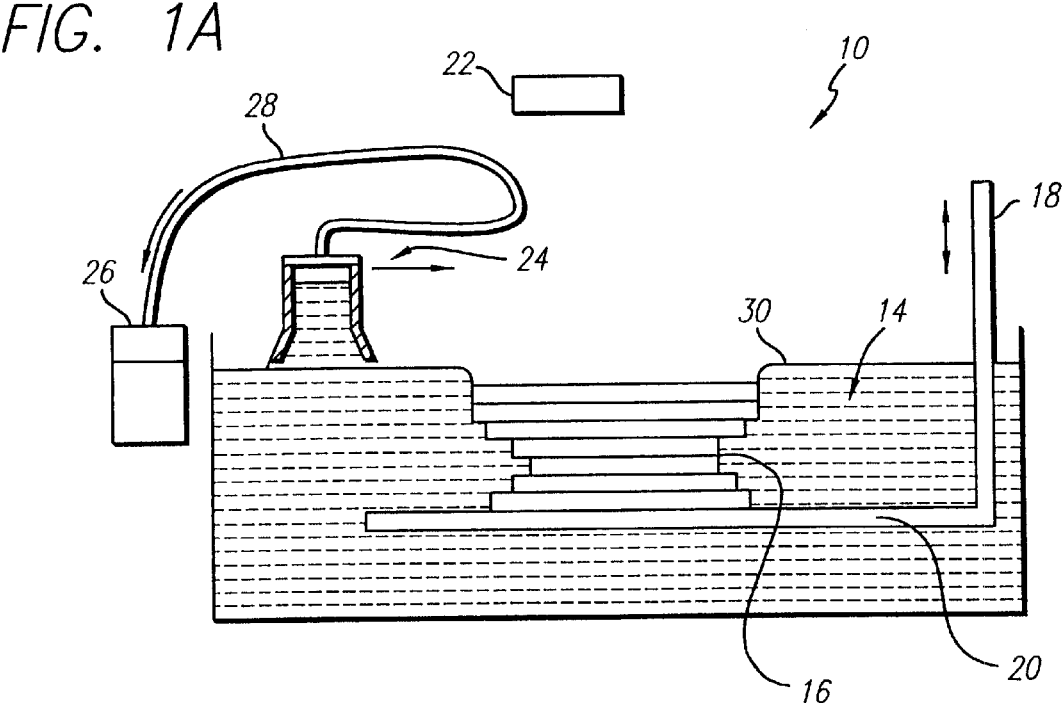
FIGS. 1*a* and 1*b* depict side views of a preferred stereolithography apparatus for practicing the instant invention.
Figure 1B:
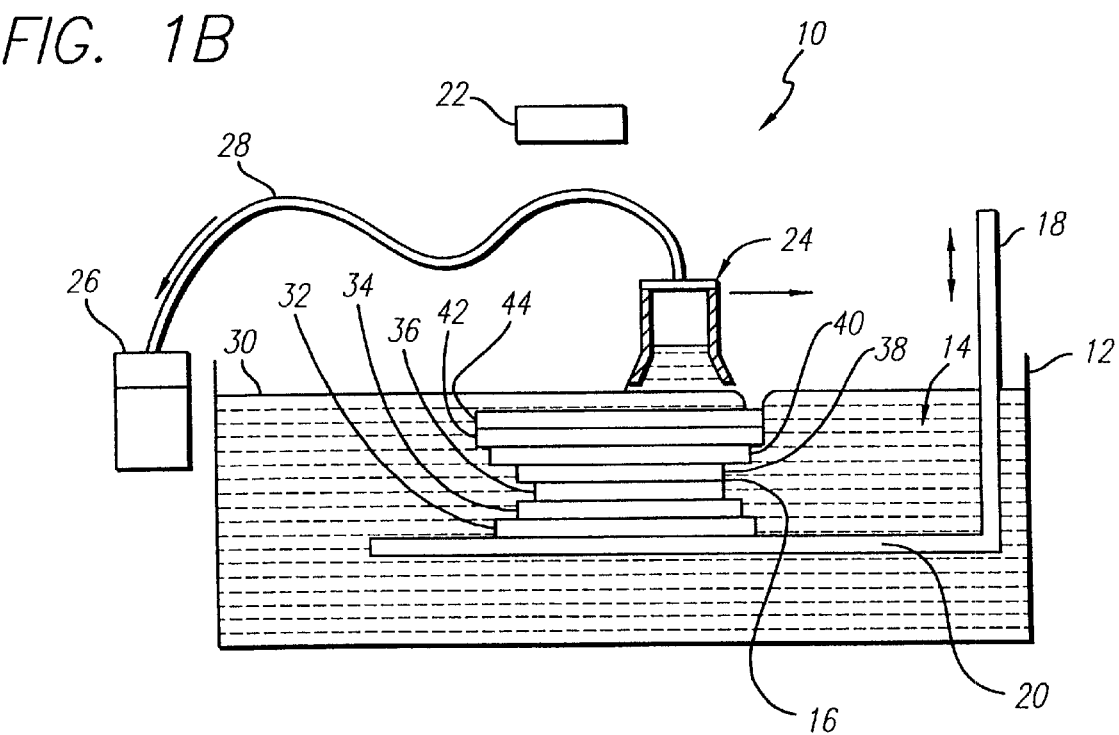

FIGS. 1a and 1b depict schematic representations of a preferred stereolithography apparatus 10 (SLA) for use with the instant invention. The basic components of a stereolithography apparatus are described in U.S. Pat. No. 4,575,330 issued Mar. 11, 1986, to Hull; U.S. Pat. No. 5,184,307 issued Feb. 2, 1993, to Hull, et al.; and U.S. Pat. No. 5,182,715 issued Jan. 26, 1993, to Vorgitch, et al. as referenced above. The preferred stereolithography apparatus as shown in FIGS. 1a and 1b includes a container 12 for holding building material 14 (e.g. photopolymerizable material) from which an object 16 will be formed, an elevator 18 and elevator driving system (not shown), an elevator platform 20, an exposure system 22, a recoating bar 24 and recoating bar driving system (not shown), and at least one computer for manipulating object data (as needed) and for controlling the exposure system, elevator, and recoating devices.

A preferred scanning system is described in several of the patents, applications and publications referenced above including U.S. Pat. No. 5,058,988 issued Oct. 22, 1991, to Spence; U.S. Pat. No. 5,059,021 issued Oct. 22, 1991, to Spence, et al.; U.S. Pat. No. 5,123,734 issued Jun. 23, 1992, to Almquist, et al.; U.S. Pat. No. 5,133,987 issued Jul. 28, 1992, to Spence, et al.; and U.S. Pat. No. 5,840,239 issued Nov. 24, 1998, to Partanen, et al. herein incorporated by reference. This preferred system includes the use of a laser, beam expander (may be separate or included in the laser), and a pair of computer controlled XY rotatable scanning mirrors of either the motor driven or galvanometer type.

Preferred control and data manipulation systems and software are described in a number of the patents referenced above, including U.S. Pat. No. 5,184,307 issued Feb. 2, 1993, to Hull, et al.; U.S. Pat. No. 5,321,622 issued Jun. 14, 1994, to Snead, et al.; and U.S. Pat. No. 5,597,520 issued Jan. 28, 1997, to Smalley, et al. herein incorporated by reference. A preferred recoating device is described in U.S. Pat. No. 5,902,537, to Almquist, et al. as referenced above and includes recoater bar 24, regulated vacuum pump 26, and vacuum line 28 connecting the bar 24 and the pump 26.

Other components of a stereolithography apparatus (not shown) may include a liquid level control system, a build chamber, an environmental control system including a temperature control system, safety interlocks, a viewing device, and the like.

It should be understood that the instant invention is applicable to object formation using a system that lacks one or more of the elements mentioned herein, and is applicable to a system that includes all elements mentioned herein, or adds additional elements.

Stereolithography apparatuses on which the instant invention can be utilized are available from 3D Systems, Inc. of Valencia, Calif. These include stereolithography apparatuses using a HeCd laser operating at 325 nm, and stereolithography apparatus using a solid state laser operating at 354.7 nm. Preferred building materials are photopolymerizable materials manufactured by CIBA Specialty Chemicals of Los Angeles, Calif., and are available from 3D Systems, Inc. These materials manufactured by CIBA Specialty Chemicals include SL 5170, SL 5190, SL 5195, SL 5220, SL 5510, and SL 5520.

The typical operation of a stereolithography apparatus involves alternating formation of coatings of material (i.e. layers of material) and the selective solidification of those coatings to form an object from a plurality of adhered laminae. The process typically begins with the elevator platform 20 immersed approximately one layer thickness below the upper surface 30 of the photopolymerizable material 14. The coating of photopolymerizable material is selectively exposed to a beam of stimulation (e.g. UV radiation) which cures the material to a desired depth to form an initial lamina of the object adhered to the elevator platform. This initial lamina corresponds to an initial cross-section of the object to be formed or corresponds to supports, which may be used to adhere the object to the platform. After formation of this initial lamina, the elevator platform and adhered initial lamina are lowered a net amount of one layer thickness into the material.

As the material is typically viscous, and the thickness of each layer is very thin (e.g. 0.025 mm to 0.250 mm (0.001 to 0.010 inch)), the material may not readily form a coating over the last solidified lamina. In the case where a coating is not readily formed, a recoating device may be swept at, or somewhat above, the surface of the resin (i.e. work surface of the material) to aid in the formation of a fresh coating. The coating formation process may involve the sweeping of the recoating device one or more times at a desired velocity. After formation of this second coating (i.e. layer of material), a portion of this second layer is solidified by exposure of the medium to stimulation according to data representing the second cross-section of the object. In alternative processes, layer formation over one portion of a previous lamina may occur simultaneously with exposure of an already formed portion of the coating. This process of coating formation and solidification is repeated over and over again until the object 16 is formed from a plurality of adhered layers (32, 34, 36, 38, 40, 42, and 44) as shown in FIG. 1b.

The stereolithography apparatus may form one or more objects at one time. These objects may be multiple copies, all of the same shape and size, may be two or more different shapes and/or sizes, or may be a combination of copies of similar shapes and sizes or different shapes and/or sizes. Even for a single object, a cross-section may include multiple isolated regions based on object geometry. The area of the liquid container generally dictates the number and size of objects formed at one time, although it is possible to "stack" parts in the Z-dimension.

The solidification process typically consists of the solidification of various regions, which are typically classified as "vector types". The use of boundary, hatch, and fill vectors is well known in the art, and taught in a number of the previously cited publications and patents such as previously referenced U.S. Pat. No. 5,321,622 issued Jun. 14, 1994, to Snead, et al. The words "vector" and "line" are often used interchangeably, most commonly when referring to a portion of material that has been solidified. In other cases, "vector" refers mainly to the data supplied, while "line" may refer mainly to the solidified portion.

Briefly, "boundaries" are border regions surrounding an area of a cross section. The area may be that of a whole cross-section or a portion of a cross-section. Boundaries may be defined, inter alia, to surround up-facing cross-sectional regions, down-facing cross-sectional regions, and continuing cross-sectional regions (regions that face neither up nor down). Boundary vectors may be exposed one or more times, or may be offset and exposed one or more times, or may not be exposed at all.

"Skin Fill", or "Fill", or "Skin", is typically an exterior portion of the cross section that faces either upward or downward and is thus an area that is typically completely exposed so as to form a solid surface region. "Hatch" is found within continuing regions or boundaries and may or may not be found in down and up facing exterior regions. Hatch may consist of a series of lines, point exposures (i.e. bullets), tiling patterns, or other patterns of exposure. Hatch patterns may result in complete solidification of the boundary regions within which it is used, or may result in partial solidification of those regions. Hatch and skin patterns may consist of overlaid exposures, crossing exposures, or repeated exposures. Hatch and/or fill may be retracted from one or more boundaries. Especially, hatch and/or fill may be retracted from a first boundary that is exposed.

In one classification scheme (as described in U.S. Pat. No. 5,321,622 issued Jun. 14, 1994, to Snead, et al.) each lamina of the object can contain one, two or three different regions: (1) down-facing regions; (2) up-facing regions, and/or (3) continuing regions (i.e. regions that are neither down-facing nor up-facing). In this scheme, the following eight vector types might be utilized though others may be defined and used:

Down-facing boundaries Boundaries that surround down-facing regions of the object.

Up-facing boundaries Boundaries that surround up-facing regions of the object.

Continuing boundaries Boundaries that surround regions of the object that are neither up-facing nor down-facing Down-facing Hatch Lines of exposure that are positioned within the down-facing boundaries. These lines may be closely or widely spaced from one another and may extend in one or more directions.

Up-facing Hatch Lines of exposure that are positioned within the up-facing boundaries. These lines may be closely or widely spaced from one another and may extend in one or more directions.

Continuing Hatch Lines of exposure that are positioned within continuing boundaries. These lines may be closely or widely spaced from one another and may extend in one or more directions.

Down-facing Skin/Fill Lines of exposure that are positioned within the down-facing boundaries and closely spaced so as to form a continuous region of solidified material.

Up-facing Skin/Fill Lines of exposure that are positioned within the up-facing boundaries and closely spaced so as to form a continuous region of solidified material.

Taken together, the down-facing boundaries, down-facing hatch and down-facing fill define the down-facing regions of the object. The up-facing boundaries, up-facing hatch, and up-facing fill define the up-facing regions of the object. The continuing boundaries and continuing hatch define the continuing regions of the object.

Other schemes for region identification and vector type creation are described in various patents and applications referenced above, including U.S. Pat. No. 5,184,307 issued Feb. 2, 1993, to Hull, et al.; U.S. Pat. No. 5,209,878 issued May 11, 1993, to Smalley, et al.; U.S. Pat. No. 5,238,639 issued Aug. 24, 1993, to Vinson, et al.; U.S. Pat. No. 5,597,520 issued Jan. 28, 1997, to Smalley, et al.; and PCT Publication PCT Publication WO 97/11837 published Apr. 3, 1997, by Leyden, et al. and PCT Publication WO 98/51478 published Nov. 19, 1998, by Nguyen. Some schemes might involve the use of fewer designations such as: (1) defining only outward facing regions and continuing regions where down-facing and up-facing regions are combined to form the outward facing regions; (2) combining all fill types into a single designation; or (3) combining up-facing and continuing hatch into a single designation or even all three hatch types into a single designation. Other schemes might involve the use of more designations such as dividing one or both of the up-facing and down-facing regions into flat regions and near-flat regions, as described in U.S. Pat. No. 5,184,307 issued Feb. 2, 1993, to Hull, et al.

Other region identifications might involve the identification of which portions of boundary regions associated with each lamina are outward facing and/or interior to the lamina. Interior boundaries are bounded on both sides by object portions of the lamina whereas outward boundaries are bounded on one side by an object portion of the lamina and on the other side by a non-object portion of the lamina. Outward facing boundary regions are associated with the initial cross-section boundaries (i.e. the cross-sectional boundary regions existing prior to dividing them into down-facing, up-facing, and continuing boundary regions) and are described in U.S. Pat. No. 5,321,622 issued Jun. 14, 1994, to Snead, et al. and U.S. Pat. No. 5,597,520 issued Jan. 28, 1997, to Smalley, et al.

Various solidification techniques may be used to expose the medium to stimulation. One possible solidification technique begins with exposure of the boundaries. Next, the area inside the boundaries. is exposed with hatch vectors and/or fill vectors. This may be accomplished with one or more passes of the laser beam across the area inside the boundaries, but preferably with two passes. In the event that two passes are used, it is preferable that the two passes occur in different, and typically perpendicular, directions. In this case, the first pass of the laser beam scans the object cross-section in a first direction, and the second pass scans the object cross-section in a second direction, generally perpendicular to the first direction. Depending on the position of the cross-section in relationship to the cross-sections above and below it, additional scanning of portions or all of the cross section may be accomplished with fill vectors or the like.

Another possible solidification technique begins with the scanning of one or more passes of hatch vectors, then any fill vectors necessary, followed with the boundary vectors. Yet another solidification technique may begin with a first pass of hatch vectors in one direction, then the scanning of the boundary vectors, then the second pass of hatch vectors in a second direction, and ending with the fill vectors.

It is also possible that more than one pass of boundary or fill vectors is desirable, that multiple passes of fill vectors may be in one or more directions, and/or that multiple passes of boundary vectors may be offset from one another. Other solidification techniques may use fill vectors, and no hatch vectors, or may use hatch vectors, and no fill vectors. These techniques may or may not include the use of one or more boundary vectors.

Other solidification techniques may involve the use of raster exposures in one or more directions, or even combinations of vector and raster exposures. Hatch and/or fill may be exposed in patterns that spiral inward or outward or track boundary paths.

A large variety of solidification techniques may be derived from the above examples, given, for example, that the one or more passes of hatch vectors in one or more directions, one or more passes of boundary vectors, and one or more passes of fill vectors in one or more directions may be performed in various sequences. The sequence or sequences chosen may involve exposure of multiple passes of the same vector type in sequence, or may involve separating the multiple passes of the same vector type with exposure of a different vector type or types.

In some embodiments, different sized beams may be used for exposing a layer. A relatively narrow beam (e.g. small diameter) may be used for one or more border vectors. A relatively narrow beam may be thinner than about 0.500 mm (0.020 inch), and preferably thinner than about 0.380 mm (0.015 inch). Alternatively, a relatively wide beam may be used for some border vectors, while a narrower beam is used for other border vectors. A relatively wide beam may be wider than about 0.380 mm (0.015 inch), and preferably wider than about 0.500 mm (0.020 inch). The relatively wide beam is preferably wider than the relatively narrow beam. Hatch and fill vectors may be drawn with a relatively narrow or relatively wide beam, or with a combination of relatively narrow and relatively wide beams. The determination of whether to use a relatively narrow beam, a relatively wide beam, or a combination, may be generally based on the feature size and/or feature geometry.

Additional possibilities include solidification by a mask and flood exposure technique, use of deformable mirrors, and other transmissive or reflective light valve techniques.

In addition, the solidification techniques may involve a pause, or delay, after exposure of at least a portion of a cross section. A delay may follow the exposure of all or some boundary, hatch, or fill vectors, in one or more directions. This delay may be used as a shrinkage period, where shrinkage results from, inter alia, one or both of chemical bond formation and cooling of the area last solidified by the laser.

This delay may be determined in any number of ways using various methods and apparatus. The delay period may be specified by the user for each build, or it may remain fixed until it is changed by the user. Alternatively, the delay may be determined by one or a combination of variables, such as 1) material type, as some materials require more delay between scans than other materials, 2) maximum possible area of a cross-section, which may be determined by the area of the stereolithography apparatus platform, 3) area of a last formed cross section or maximum or average area of a group of cross sections, 4) laser power, 5) scan rate, 6) laser profile, 7) beam size, 8) area exposure rate, and/or 9) the measured or calculated temperature of the resin. The delay associated with one or more of these variables may be determined experimentally, or possibly automatically. Alternatively, the delay may be a default amount of time independent of these or other variables.

The lapse of a desired delay time may not be based on evaluation of lapse time from a clock but instead may be based on another parameter which corresponds to a lapse of time (e.g. length of scanning, variation in temperature, and the like). As a further alternative, the delay may be based on certain conditions being met (e.g. shrinkage observed, optical property observed, lamina(e) temperate, etc.). For example, it may be possible to observe shrinkage, and look for movement to stop or slow to a desired rate. Alternatively, a camera or cameras or other optical or electro-optical component(s) may be used to evaluate an optical parameter. For instance, it may be possible to use a thermal camera to determine where drawing has occurred in the liquid container, followed by use of a (regular) camera or sensor that is selectively focused at an area or areas, to look for a change in an optical property (e.g. index of refraction) or for a specified optical property parameter to be met.

During this delay, it is possible that some overhead item or items, such as for instance laser beam profiling, may be performed so that total time per layer is reduced. Instead of or in addition to overhead items, boundaries may be drawn during the delay to decrease overall time per layer.

In addition, it is possible to add an additional object or objects to the platform, which are drawn as the desired time elapses. Put another way, an additional object or objects may be added to the platform, which will be scanned between hatch vector passes of the main object(s), to cause a delay between the hatch vector passes of the main object(s). It is conceivable that different sized additional objects could be used as a means to "control" the desired delay between passes.

The present invention presents techniques for forming highly accurate objects quickly by overcoming distortion problems that can exist when solidifying a photopolymerizable material. This invention pertains to both planar lamina formation and fragmented formation stereolithography techniques. As mentioned above, it is believed that the techniques of the present invention may have application in the other rapid prototyping technologies for the purposes of reducing distortion and/or speeding object formation.

The present invention provides techniques for reducing distortion, while at the same time minimizing build time. These techniques include the partial exposure of a layer, then a delay, then completing the exposure of the layer. By inserting a delay between exposures of a layer rather than after the layer is fully exposed, any shrinkage caused by cooling or by chemical bond formation may slow or stop prior to any additional exposure compounding these distortion engines. In addition, it is preferable that the initially exposed material does not adhere to the previously solidified lamina until a subsequent exposure causes adhesion to occur. This lack of adhesion from the first exposure, combined with the delay prior to subsequent exposure, provides hereto-unforeseen advantages in distortion control.

We next turn our attention to specific preferred embodiments of the instant invention that will be described in view of the preliminary information and background provided above. The headers associated with the following embodiments are intended to aid reading this disclosure but are not intended to isolate or limit the applicability of the teachings herein to those individual embodiments in connection with which explicit disclosure is made.

The First Embodiment

The first preferred embodiment of the instant invention involves the formation of a single object on a platform. A first hatch vector pass of the laser beam scans the object cross-section along the X-axis. Upon completion of this pass, a delay period of 15 seconds begins. When the delay period ends, layer scanning begins with hatch vectors along the Y-axis. This embodiment is depicted in the flow chart of FIG. 2.

Referring now to FIG. 3, this process is described in more detail. FIG. 3 depicts a side view of an object 98 to be produced stereolithographically. In terms of forming horizontal layers, this figure depicts the vertical axis (Z) and one of the horizontal axes (X). As illustrated, the object 98 includes seven laminae, labeled 100–106 wherein each lamina includes a boundary region labeled B and a hatch region labeled H or a fill region labeled F. Object 98 will be used throughout the description of preferred embodiments of the instant invention to illustrate various features associated with those embodiments. Object 98 will also be used to illustrate some typical aspects associated with standard stereolithographic practice that will be helpful in understanding the instant invention and its embodiments.

We will focus on the process of building lamina 103 with the techniques of the present invention. This description of the first embodiment—and the descriptions of the additional embodiments and alternatives to follow—applies to the formation of continuing regions of object cross-sections. These regions are bounded from below by the previous lamina and above by the next lamina. The descriptions of the embodiments do not apply to the formation of down-facing or up-facing regions.

First, a 0.100 mm (0.004 inch) thich layer of liquid is prepared in anticipation of the drawing of lamina 103. Examples of techniques usable in this process are described in detail in previously cited and incorporated by reference U.S. Pat. No. 5,174,931 issued Dec. 29, 1992, to Almquist, et al, and U.S. Pat. No. 5,902,537, by Almquist, et al. Once the liquid layer is prepared, boundary elements 110 are drawn (reference element 50, FIG. 2). These boundary elements, as described earlier, outline the borders of the lamina and are typically formed using a vector exposure. The cure depth for these lines in enough to attach these lines to the lamina priviously solidified, and is about 0.230 mm (0.009 inch). Unless otherwise stated in the teaching herein, when a quantity of exposure is referred to in terms of cure depth, the quantity is that which would be obtained had no other exposure occurred. As taugh in incorporated by reference U.S. Pat. No. 5,184,307 issue Feb. 2, 1993, to Hull, et al., the outer boundary is preferably line width compensated inwardly by approximately one half the width of a cured line of material, which is about 0.125 mm (0.005).

Next, the first pass of hatch vectors 112 is drawn parallel to the X-axis (reference element 52, FIG. 2). These vectors are drawn interior to the boundaries, and preferably retracted from the position of the line width compensated boundaries at both their beginning and ending points by an amount greater than one half the line width, for example, about 0.250 mm (0.010 inch). This retraction would preferably prevent the hatch vectors from touching the boundaries. Retraction of hatch vectors from the boundary vectors is described in U.S. Pat. No. 5,321,622 issued Jun. 14, 1994, to Snead, et al. The cure depth for these vectors is preferably slightly less than the layer thickness, for example about 0.075 mm (0.003 inch).

Upon completion of scanning of the hatch vectors along the X-axis, a delay period (reference element 54, FIG. 2) of, for example, 15 seconds begins. As described earlier, this delay allows at least one of the cured material to shrink, and/or any heat that may have built up from the curing process to dissipate. If a second set of vectors were drawn immediately on top of the first set of vectors, the second set of vectors will exhibit affects from their own shrinkage and heat dissipation, as well as residual affects from the lines below them which are still shrinking and cooling. The delay thus leads to a decrease in residual stresses caused by shrinkage and heat dissipation, and a decrease in the associated part distortions.

Upon lapse of the delay, a second pass of hatch vectors 112, also interior to the boundary vectors, is drawn parallel to the Y-axis (reference element 56, FIG. 2). The vectors are preferably retracted at both begin and end points by the same amount as the first pass of hatch vectors. The cure depth for these vectors is preferably slightly greater than the layer thickness, for example about 0.125 mm (0.005 inch). As these vectors overlap the vectors along X, the total depth of cure achieved by the points that overlap will be greater than the layer thickness by an amount sufficient to ensure adequate adhesion to the lamina below, for example about 0.075 mm (0.003 inch).

An additional boundary is then drawn, interior to the first boundary, which bridges any gap between the hatch vectors and the first boundary (reference element 58, FIG. 2). This inner boundary is offset from the line width compensated position of the first boundary by about one half the width of a boundary vector, so that the boundaries partially overlap each other, for example by about 0.125 mm (0.005 inch). The cure depth for this second boundary may be slightly less than the layer thickness, for example about 0.075 mm (0.003 inch). Alternatively, the cure depth for the second boundary may be an amount sufficient to adhere to the lamina below (this will increase build time).

Preferred parameters used for the formation and exposure of layer 103 appear in Table 1A, below.

TABLE 1A

Parameters used for formation and exposure of layer 103.

| Parameter | Approximate Value Used |
|---|---|
| Layer Thickness | 0.100 mm (0.004 inch) |
| Outer Boundary Cure Depth | 0.230 mm (0.009 inch) |
| Outer Boundary Line Width Compensation | 0.125 mm (0.005 inch) |
| First Pass Hatch Cure Depth | 0.075 mm (0.003 inch) |
| Delay | 15 seconds |
| Second Pass Hatch Cure Depth | 0.125 mm (0.005 inch) |
| Hatch Retraction from Compensated Outer Boundary | 0.250 mm (0.010 inch) |
| Inner Boundary Cure Depth | 0.075 mm (0.003 inch) |
| Inner Boundary Offset from Compensated Outer Boundary | 0.125 mm (0.005 inch) |

For lamina 103, scanning is complete, and the layer formation in preparation for lamina 104 may begin. Subsequent laminae are then formed, using the technique described for lamina 103, or may be formed according to some other technique. Examples of other formation techniques are described hereinafter.

The technique described in the first embodiment—and the techniques described in the following embodiments and alternatives—may be applied to up-facing and/or down-facing regions, which may be formed with a plurality of overlaying hatch and/or skin fill exposures. The delay may be applied between the first and second of the plurality, and/or between any other members of the plurality.

Alternatives

It should be understood that the first embodiment, as well as other embodiments to be discussed hereinafter, is not limited to the specific parameters utilized in the examples given, but instead can be applied using various parameters. Thus, the alternatives discussed in this section may apply to the first embodiment and to any other embodiments or implementations to follow.

For example, the layer thickness may be greater or less than 0.100 mm (0.004 inch). In other words, the layer thicknesses as measured between similar levels (e.g. upper levels) of two consecutive layers can be set to any workable value. The thickness between layers may be set to any appropriate amount to yield the desired resolution. Changes in the layer thickness may require changes to other parameters, such as the cure depth values used for various vector types. Any parameter adjustments necessary will be evident to one of skilled in the art upon review of the instant disclosure and may be readily determined experimentally.

In another alternative to the embodiment, a delay period of any value can be used (e.g. more or less than the 15 seconds used in the above embodiment). The desired length of the delay may be set based on a variety of factors described earlier in the introduction section, or may be automatically determined during building with a feedback mechanism, such as those discussed earlier.

In a further alternative to the embodiment, the hatch vectors may be retracted only where their end points meet the boundaries, or only where their start points meet the boundaries. Additionally, the set of hatch vectors may or may not be retracted on its sides, so that the edges do not touch the boundary vectors. The amount of retraction may vary intra-vector, inter-vector, by pass of vectors, by layer, or by range of layers.

In yet another alternative to the embodiment, rather than multiple boundaries, a layer may have just one boundary. For instance, the curing of a layer may begin with the exposure of the first set of hatch followed by a delay, then the exposure of the second set of hatch, and then finally exposure of the boundary. In this example, it is preferred that the first set of hatch do not adhere to the layer below. In another alternative with only one boundary, the curing of the layer would begin with exposure of a set of hatch followed by a delay and then exposure of the boundary. In this example, the first set of hatch would once again not adhere to the layer below.

As can be seen from this last example, in another alternative only one pass of hatch may be used. Another example of this would be to cure a layer starting with an outer boundary which would attach to the layer below, then be followed with a pass of hatch retracted from the boundary. This hatch would not attach to the layer below or to the boundary just drawn. A delay would follow the hatch, then an inner boundary would be drawn attaching the outer boundary and the hatch. This inner boundary may or may not adhere to the layer below. Another example of the use of only one pass of hatch would cure a layer beginning with an inner boundary which would not adhere to the layer below. This would be followed by a pass of hatch which may or may not adhere to the boundary just drawn and would not adhere to the layer below. Then a delay would occur followed by an outer boundary which would adhere to the layer below. Alternatives might allow otherwise non-adhering boundaries to adhere at one or more locations that are preferably not located on opposite extents of the cross-section being formed.

In cases where more than one boundary is used, the multiple boundaries may directly overlap one another, or may be offset by a fraction of the width of the boundary, or by exactly one boundary width, or more than one boundary width. Where multiple boundaries are used, the inner boundary may be drawn first. This boundary may have a cure depth slightly less than the layer thickness, but not necessarily. Then the hatch vectors may be drawn, and they may touch the inner boundary at their begin and end points, or only at their begin points, or only at their end points, or may not touch the boundary at all. Then an outer boundary or boundaries may be drawn. The boundary vectors may be offset from one another so that they do not touch, are barely touching, or overlap entirely or by some amount.

It is also possible that, after the inner and outer boundaries are drawn, a boundary or boundaries intermediate to the innermost and outermost boundaries are drawn. In addition, all or some of the hatch vectors may be drawn prior to all, some, one, or none of the boundaries. This includes the possibility that all, one, or some of the boundaries may be drawn during the delay period. In fact, the first and second passes of hatch vectors for each object/element may be consecutive, or may be separated from one another by one or more additional exposures of one or more vector types.

An object/element's fill vectors, if any are necessary or desired, may follow the last pass of hatch vectors, or may occur before some, but after other, of the hatch vectors are scanned. Thus, the order of various passes of hatch and fill vectors, delay period(s), and boundary vectors can vary.

Other alternatives are conceivable, such as for example, the use of no boundary vectors. In such a case, it may be desirable that the first set of hatch vectors include at least one or more points where the cure depth is equal to or greater than the layer thickness—sufficient to touch and/or adhere to the previous lamina. However, if the cure depth of the first set of hatch vectors is less than the layer thickness, it is preferred to have the combined total depth of cure from the first and second set of hatch vectors sufficient to cause adhesion to the lower lamina, although in certain circumstances such adhesion may not be necessary, in which case the net cure depth may be less than the layer thickness.

It should be appreciated that the first set of hatch vectors may be scanned in any direction, not necessarily parallel to the X-axis. In addition, these vectors may be cured to a depth equal to, less than, or greater than the desired layer thickness. It is typical that if cure depth is greater than layer thickness, adhesion occurs and unrestrained shrink cannot occur. However, it is conceivable for certain materials and exposure combinations that a cure depth greater than the layer thickness may be used on the first exposure, and some unconstrained shrink can occur, resulting in reduced distortion of the object.

Of course, the second set of vectors may also be scanned in any direction, not necessarily perpendicular to the first direction, and may have a cure depth equal to, less than, or greater than the desired layer thickness. Thus, it is possible that the combined total depth of cure from the first and second set of hatch vectors will be equal to, greater than, or less than the desired layer thickness. In cases where the combined total depth of cure from the sets of hatch vectors is less than a layer thickness, it may be useful to attach the area to a previous lamina using a rivet, or a number of rivets (rivets are described in the incorporated by reference U.S. Pat. No. 5,104,592 issued Apr. 14, 1992, to Hull, et al., with a few widely spaced hatch vectors, or the like. Although it is the typical experience that for adhesion to occur, total depth of cure must be equal to or greater than layer thickness, it is conceivable that for a given material and radiation combination, adhesion may be achieved even when total depth of cure is less than the layer thickness.

Of course, it is possible that more than two passes of hatch vectors are used, or that only one pass is used. For instance, a single exposure of hatch may be utilized in an up-facing or down-facing area, where a single exposure of skin fill will also be utilized, with a delay between the hatch and fill.

In another alternative, a single direction of hatch may be used, but will be divided into two exposure passes. The first pass will expose every other hatch vector, and the next exposure will expose those vectors intermediate to those first exposed.

The Second Embodiment

The second preferred embodiment of the instant invention is a continuation of the first embodiment as applied to the formation, on one platform, of more than one object, or an object or objects with multiple cross-sectional elements. In such a situation, the techniques described above in the first embodiment are simply followed for each object and/or cross-sectional element, in turn. The cure depth values, line width compensation values, and offset values used for lamina 103 in the first embodiment apply equally to the objects and cross-sectional elements of this embodiment. For clarity, this discussion will assume that two objects and/or cross-sectional elements are being built, and that they are both at a position composed of only continuing regions. The second embodiment is depicted in the flow chart of FIG. 4.

Figure 4:
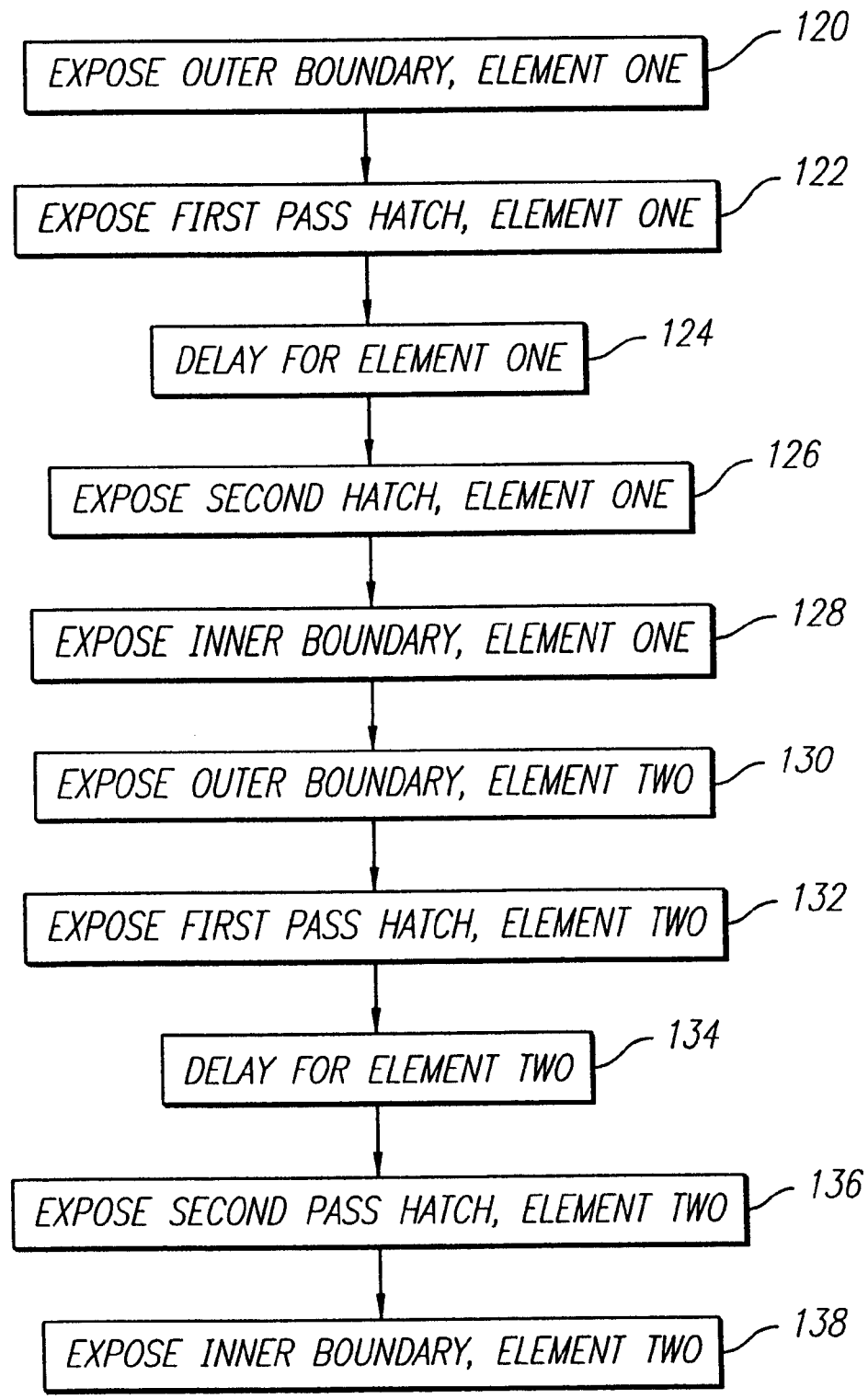
FIG. 4 is a flow chart depicting the second embodiment.

To begin, the outer boundary is completed for the first object and/or cross-sectional element (reference element 120, FIG. 4). Then the first and second hatch vector passes, 122 and 126 of FIG. 4, respectively, for the first object/element are drawn, separated by the delay period 124 for the first object/element. Next, the inner boundary 128 for the first object/element is completed.

Once the scanning of the first object and/or cross-sectional element is complete, the scanning of the boundary 130 of the second object and/or cross-sectional element commences. Then, the two hatch vector passes, 132 and 136 respectively, for the second cross sectional object/element are drawn, with the delay 134 for the second object/element between them. Finally, the inner boundary 138 of the second object and/or cross-sectional element is formed.

This process is preferably repeated for each object and/or cross-sectional element on the platform, though in some circumstances it may be preferred to use this technique in forming only a portion of the object laminae.

As described earlier, this technique may be applied to up-facing and/or down-facing regions, which may be formed with a plurality of overlaying hatch and/or skin fill exposures. A delay may be applied between the first and second of the plurality, and/or between any other members of the plurality.

The Third Embodiment

The third preferred embodiment of the instant invention is also a continuation of the first embodiment as applied to the formation, on one platform, of more than one object, or an object or objects with multiple cross-sectional elements. Therefore, this embodiment is, in effect, an alternative to the second embodiment. The cure depth values, line width compensation values, and offset values used for lamina 103 in the first embodiment apply equally to the objects and cross-sectional elements of this embodiment. For clarity, this discussion will assume that two objects and/or cross-sectional elements are being built, and that they are both at a position composed of only continuing regions.

Figure 5:
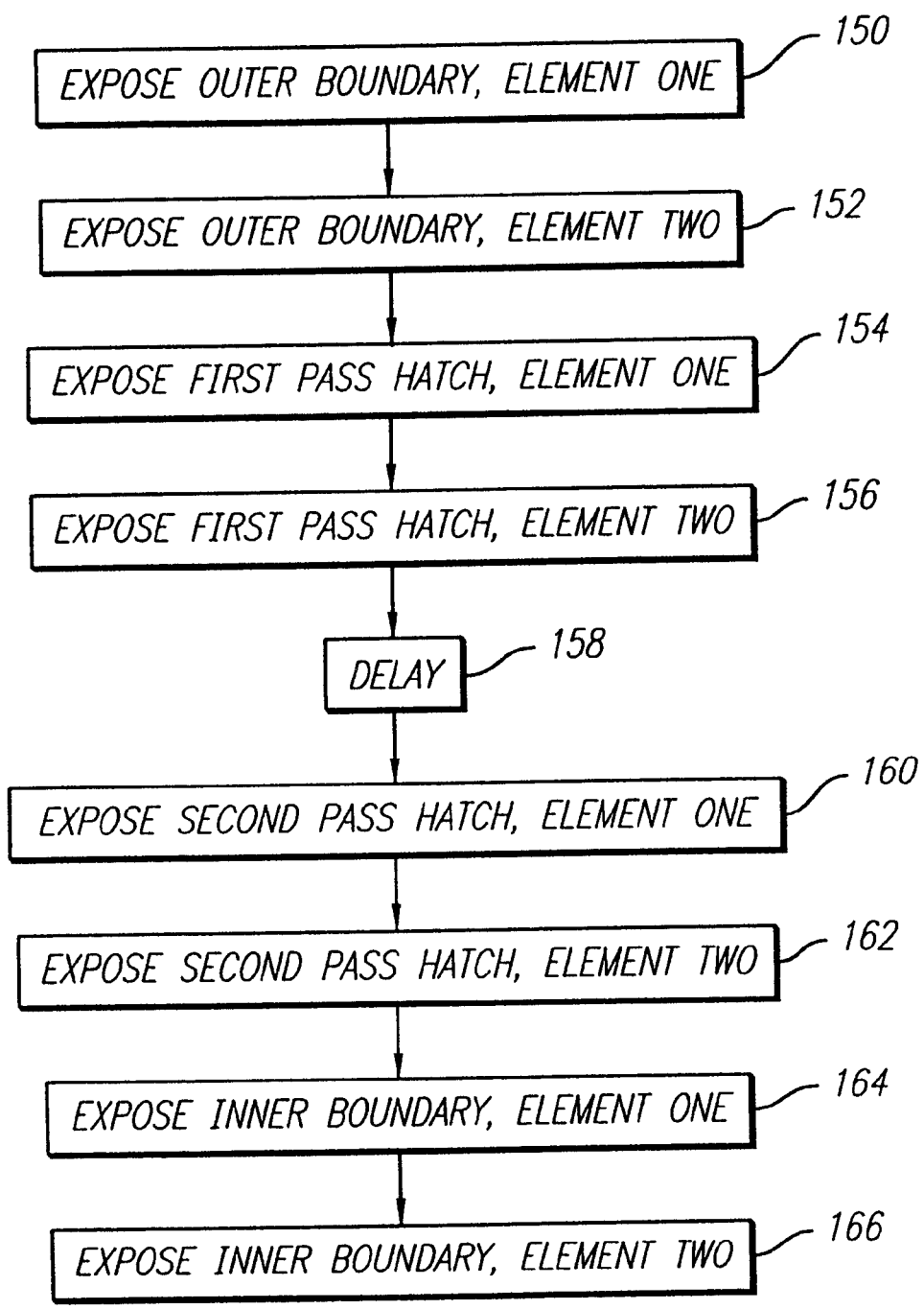
FIG. 5 is a flow chart depicting one implementation of the third embodiment.

A first implementation of the third embodiment is depicted in the flow chart of FIG. 5. First, the outer boundary 150 of the first object and/or cross-sectional element is drawn. Then the outer boundary 152 of the second object/element is completed. Next, the first pass of hatch vectors 154 for the first object/element is scanned. Then the first pass of hatch vectors 156 for the second object/element is scanned. Upon completion of this pass, a delay period 158 begins. When the delay period ends, the second pass of hatch vectors 160 for the first object/element is scanned. Then the second pass of hatch vectors 162 for the second object/element is scanned. The inner boundary 164 of the first object/element is then scanned, followed by the scanning of the inner boundary 166 of the second object/element.

Figure 6:
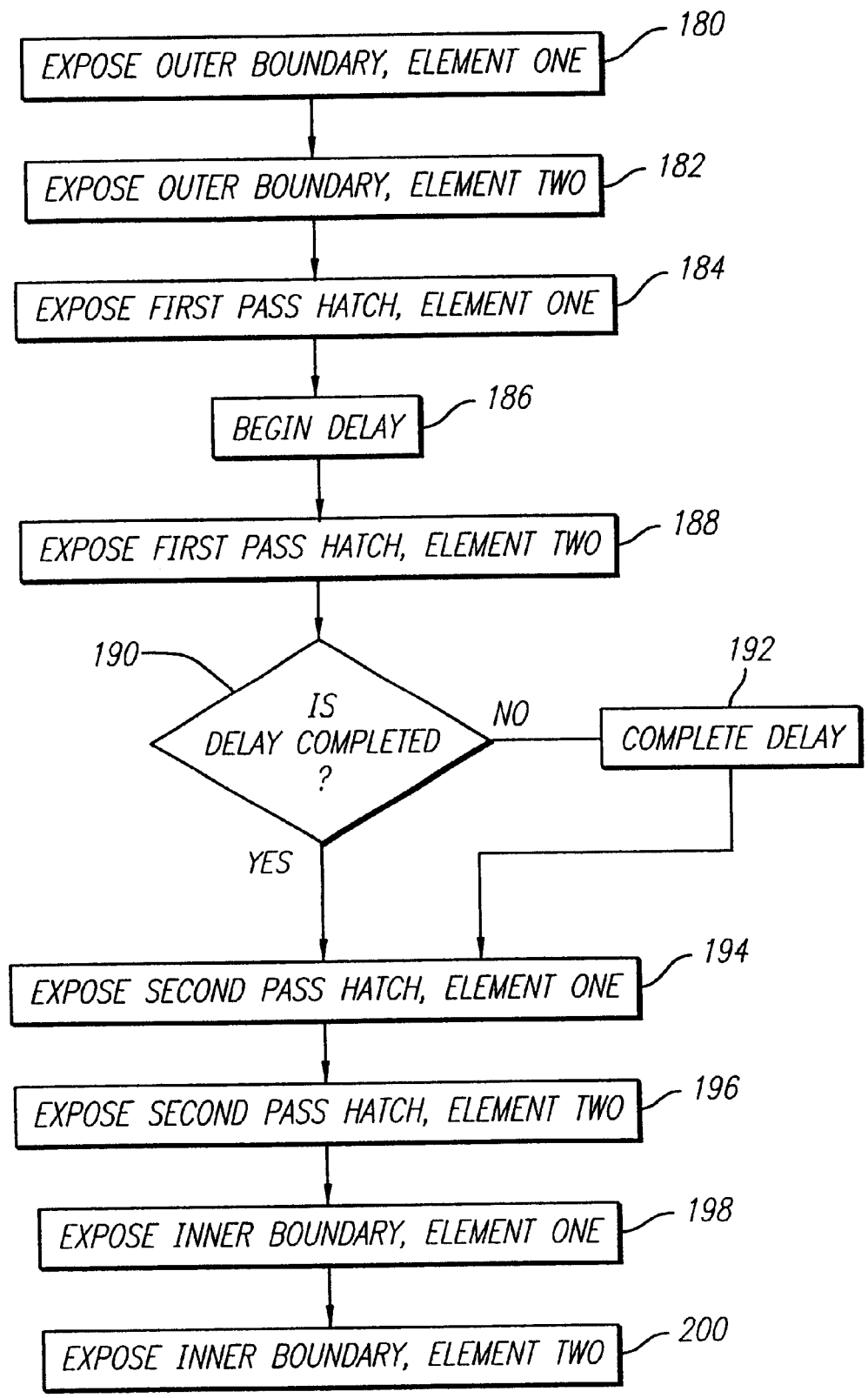
FIG. 6 is a flow chart depicting one implementation of the third embodiment.

In a more preferred implementation of the third embodiment, depicted in the flow chart of FIG. 6, the delay period begins once the scanning of the first set of hatch vectors 184 for the first object/element is completed. Based on this concept, first the outer boundary 180 of the first object and/or cross-sectional element is drawn. Then the outer boundary 182 of the second object/element is completed. Next, the first pass of hatch vectors 184 for the first object/element is scanned. Upon its completion, the delay period commences 186, and at the same time, scanning commences of the first pass of hatch vectors 188 for the second object/element. Once the delay period is concluded, the first object/element receives a second hatch vector pass 194. The second pass of hatch 196 for the second object/element is then applied. Then the inner boundary 198 for the first object is formed. Finally, the inner boundary 200 for the second object/element is formed. Elements 190 and 192 indicate that after drawing the first pass of hatch for the second object/element, a check is performed to determine if the delay has already lapsed. If not, the delay is allowed to continue.

As shown in Table 2 below, this process can result in an insufficient amount of delay for cross-sectional elements other than the first cross-sectional element. For instance, if the delay was 15 seconds, a first cross-sectional element took 3 seconds to scan, and a second cross-sectional element took 7 seconds to scan, the effective delay for the second cross-sectional element would only be 11 seconds. This is seen in Table 2 as the elapsed time from completion of drawing the first set of hatch vectors of the second element to the beginning of drawing the second set of hatch vectors of the second element.

TABLE 2

Time implications of one implementation of the third embodiment.

| Action | Estimated Time | Elapsed Time when Action Begun | Elapsed Time when Action Complete |
|---|---|---|---|
| Draw boundaries of first element | 1 sec | 0 sec | 1 sec |
| Draw boundaries of second element | 2 sec | 1 sec | 3 sec |
| Draw first set of hatch vectors of first element | 3 sec | 3 sec | 6 sec |
| Begin delay and | 15 sec | 6 sec | |
| Draw first set of hatch vectors of second element | 7 sec | 6 sec | 13 sec |
| Complete delay | | | 21 sec |
| Draw second set of hatch vectors of first element | 3 sec | 21 sec | 24 sec |
| Draw second set of hatch vectors of second element | 7 sec | 24 sec | 31 sec |

Consider now another implication of this implementation that could result in an excessive delay for some cross-sectional elements, and could extend the built time for the lamina. For instance, if the delay was again 15 seconds, a first cross-sectional element took 7 seconds to scan, and a second cross-sectional element took 3 seconds to scan, the effective delay for the second cross-sectional element would be 19 seconds. This is seen in Table 3 below as the elapsed time between completion of drawing the first set of hatch vectors of the second element and beginning to draw the second set of hatch vectors of the second element. Using the technique of Table 3, the lamina will take 35 seconds to draw, compared to 31 seconds for the technique depicted in Table 2.

TABLE 3

Time implications of one implementation of the third embodiment.

| Action | Estimated Time | Elapsed Time when Action Begun | Elapsed Time when Action Complete |
|---|---|---|---|
| Draw boundaries of first element | 1 sec | 0 sec | 1 sec |
| Draw boundaries of second element | 2 sec | 1 sec | 3 sec |
| Draw first set of hatch vectors of first element | 7 sec | 3 sec | 10 sec |
| Begin delay and | 15 sec | 10 sec | |
| Draw first set of hatch vectors of second element | 3 sec | 10 sec | 13 sec |
| Complete delay | | | 25 sec |
| Draw second set of hatch vectors of first element | 7 sec | 25 sec | 32 sec |
| Draw second set of hatch vectors of second element | 3 sec | 32 sec | 35 sec |

Depending on user inclinations and purposes of the end products, it may be preferable to save build time and have less than the complete delay for all objects, or it may be preferable to extend the build time to ensure that all objects receive the total delay time. A further alternative which would save build time, but might also result in a less than complete delay for all objects, would begin the delay as the exposure of the first set of hatch of the first element began.

Yet another implementation of the third embodiment involves ensuring the delay for each cross-sectional element separately. In other words, the time from completion of the first pass of each element until the start of the second pass for each element, respectively, would be as long as the desired delay. For example, if the delay was 15 seconds, a first element took 3 seconds to scan, and a second element took 7 seconds to scan, there would be a four second pause between the completion of the second scan of the first element, prior to the beginning of the second scan of the second element, as shown in Table 4.

TABLE 4

Time implications of one implementation of the third embodiment.

| Action | Estimated Time | Elapsed Time when Action Begun | Elapsed Time when Action Complete |
|---|---|---|---|
| Draw boundaries of first element | 1 sec | 0 sec | 1 sec |
| Draw boundaries of second element | 2 sec | 1 sec | 3 sec |
| Draw first set of hatch vectors of first element | 3 sec | 3 sec | 6 sec |
| Begin delay for first element and | 15 sec | 6 sec | |
| Draw first set of hatch vectors of second element | 7 sec | 6 sec | 13 sec |
| Begin delay for second element | 15 sec | 13 sec | |
| Complete delay for first element | | | 21 sec |
| Draw second set of hatch vectors of first element | 3 sec | 21 sec | 24 sec |
| Complete delay for second element | | | 28 sec |
| Draw second set of hatch vectors of second element | 7 sec | 28 sec | 35 sec |

To achieve at least a minimum delay for each element while maintaining only one delay countdown, it is preferable to scan the cross-sectional elements in order of longest scan time to shortest scan time. The advantages of this approach are now considered given the situation if a third object was added. Again, the delay is 15 seconds, the first cross-sectional element takes 12 seconds to scan, the second cross-sectional element takes 7 seconds to scan, and the third cross-sectional element takes 3 seconds to scan. The time elapsed from the completion of the first scan of the first element to the completion of the first scan of the third elements is 10 seconds—just 5 seconds less than the delay time. Therefore, the second scan of the first element may commence 5 seconds after the completion of the first scan of the third element. The time elapsed from the completion of the first scan of the second element to the completion of the second scan of the first element is 20 seconds. Therefore, the second scan of the second element may commence immediately upon completion of the second scan of the first element. The time elapsed from the completion of the first scan of the third element to the completion of the second scan of the second element is 24 seconds. Therefore, the second scan of the third element may commence immediately upon completion of the second scan of the second element. This situation is depicted in Table 5.

TABLE 5

Time implications of one implementation of the third embodiment.

| Action | Estimated Time | Elapsed Time when Action Begun | Elapsed Time when Action Complete |
|---|---|---|---|
| Draw boundaries of first element | 1 sec | 0 sec | 1 sec |
| Draw boundaries of second element | 2 sec | 1 sec | 3 sec |
| Draw boundaries of third element | 3 sec | 3 sec | 6 sec |
| Draw first set of hatch vectors of first element | 12 sec | 6 sec | 18 sec |
| Begin delay and | 15 sec | 18 sec | |
| Draw first set of hatch vectors of second element | 7 sec | 18 sec | 25 sec |
| Draw first set of hatch vectors of third element | 3 sec | 25 sec | 28 sec |
| Complete delay | | | 33 sec |
| Draw second set of hatch vectors of first element | 12 sec | 33 sec | 45 sec |
| Draw second set of hatch vectors of second element | 7 sec | 45 sec | 52 sec |
| Draw third set of hatch vectors of third element | 3 sec | 52 sec | 55 sec |

In this implementation, the effective delay for the second element is 20 seconds, and the effective delay for the third element is 24 seconds.

Another alternative that ensures an adequate delay for each object/element, and uses a single timing element, might involve starting the delay after scanning one of the objects/elements wherein the delay time is set equal to the desired delay minus the scan time for the smallest object/element being scanned in forming the lamina. The calculated delay may be allowed to elapse before beginning the second pass of exposure over any of the objects/components.

As a further alternative that ensures an adequate delay for each object/element, and uses a single timing element, might involve starting the delay after scanning one of the objects/elements wherein the delay time is set equal to the desired delay minus an amount no greater than the sum of time that it takes to scan all but the largest of the objects/elements being scanned in forming the lamina. The calculated delay may be allowed to elapse prior to beginning the second pass of exposure over any of the objects/components.

Other schemes involving the use of a single timing element to ensure an adequate lapse of time before rescanning any component, while simultaneously ensuring that the time when no exposure is occurring is less than the delay desired between exposures of the same object/element, will be apparent to those of skill in the art.

Further embodiments may use more than one timing element to ensure that the rescanning of a given object/element occurs only after the desired delay for the given object/element. The delay period for any object/element may be different from that used for other objects/elements. For example, small objects/elements (e.g. objects having cross-sectional dimensions under approximately 1–2 inches) may be given smaller delay times than larger objects (e.g. objects having cross-sectional dimensions greater than 2–4 inches). The cross-sectional dimensions may be judged along a direction of scanning individual vectors of the first pass.

Again, these techniques may be applied to up-facing and/or down-facing regions, which may be formed with a plurality of overlaying hatch and/or skin fill exposures. A delay may be applied between the first and second of the plurality, and/or between any other members of the plurality.

The Fourth Embodiment

The fourth preferred embodiment of the instant invention involves decreasing the formation time of an object built with a delay by creating two regions of the object having approximately similar scan times. A first hatch vector pass of the laser beam scans the first region. Upon completion of this pass, the delay begins and a first hatch vector pass of the laser beam scans the second region. Upon lapse of the delay, the second hatch vector pass of the first region commences, followed by the second hatch vector pass of the second region.

Figure 7A:
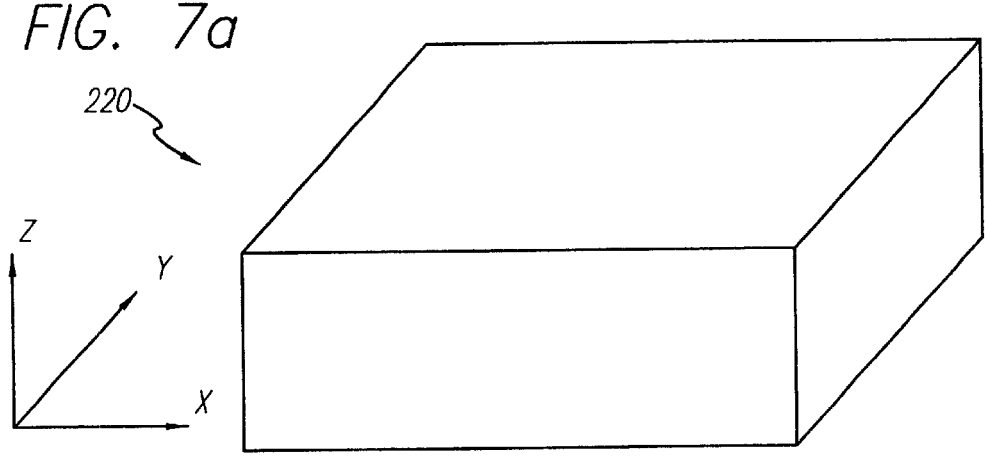
FIG. 7*a* is an oblique view of a generally rectangular object to be produced stereolithographically.
Figure 7B:
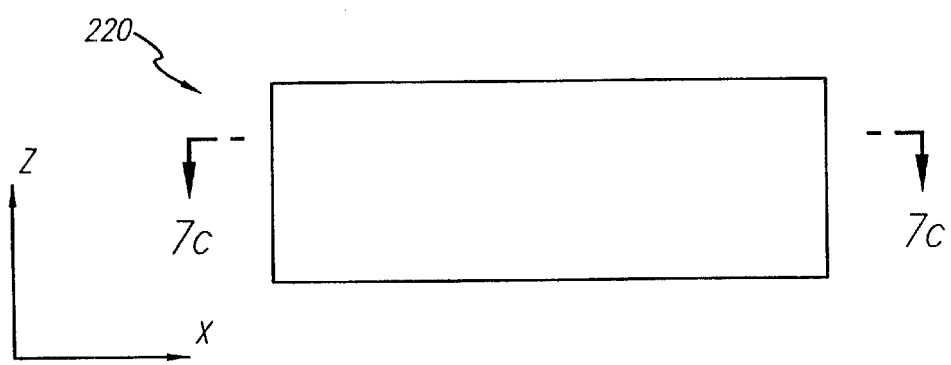
FIG. 7*b* is a side view of a generally rectangular object to be produced stereolithographically.
Figure 7C:
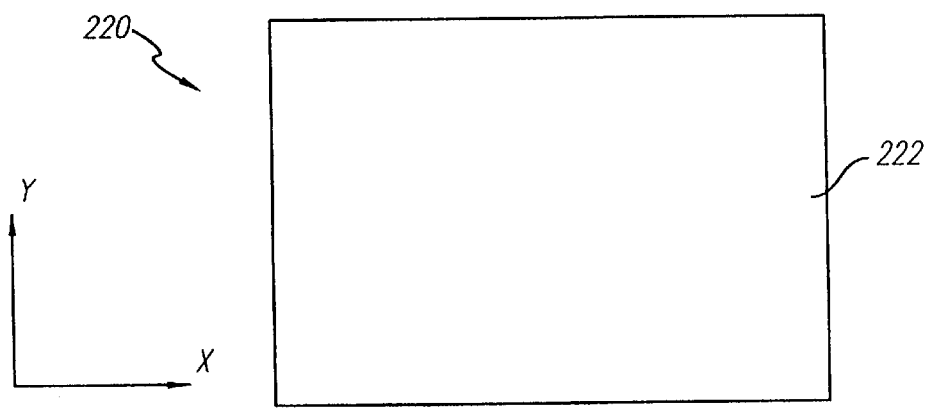
FIG. 7*c* is a section view taken along the line 7*c*—7*c* of FIG. 7*b*.
Figure 7D:
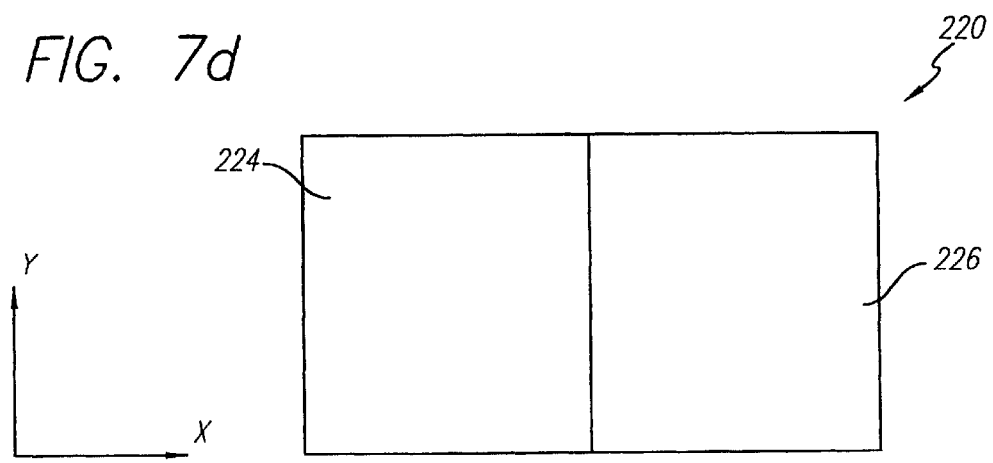
FIG. 7*d* is a top view of a generally rectangular object to be produced stereolithographically.

Consider, as in FIGS. 7a–c, an object 220 building alone. If, for example, scanning layer 222 takes 34 seconds per hatch pass, and if a 15-second delay were used, the total time for both hatch vector passes and the delay between them would be 83 seconds. If, however, the object were considered to have two approximately equal contiguous regions 224 and 226 as in FIG. 7d, the scanning of each region would take about 17 seconds per hatch pass. Therefore, region 224 would be scanned with a first hatch pass, then the delay would begin at the same time that scanning of the first hatch pass of region 226 began. The amount of time from the completion of the first hatch scan of region 224 until the completion of the first hatch scan of region 226 would be 17 seconds-greater than the 15-second desired delay. The amount of time from the completion of the first hatch scan of region 226 until the completion of the second hatch scan of region 224 would also be 17 seconds. The effective delay for each region would be greater then the desired delay, and the total time to scan first and second hatch passes for both regions, with the effective delays, would be 68 seconds. This is summarized in Table 6.

TABLE 6

Time implications of one implementation of the fourth embodiment.

| Action | Estimated Time | Elapsed Time when Action Begun | Elapsed Time when Action Complete |
| --- | --- | --- | --- |
| Draw first set of hatch vectors of region 122 | 17 sec | 0 sec | 17 sec |
| Begin delay and | 15 sec | 17 sec | |
| Draw first set of hatch vectors of region 124 | 17 sec | 17 sec | 34 sec |
| Complete delay | | | 32 sec |
| Draw second set of hatch vectors of region 122 | 17 sec | 34 sec | 51 sec |
| Draw second set of hatch vectors of region 124 | 17 sec | 51 sec | 68 sec |

Figure 8A:
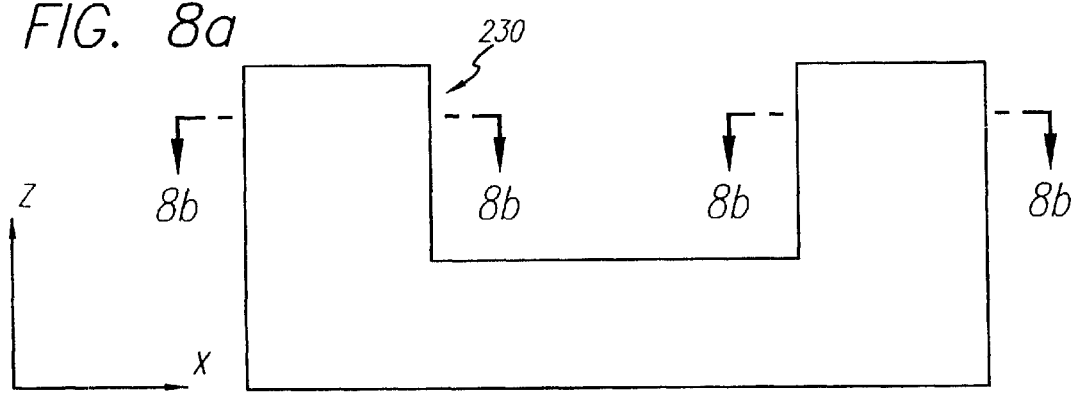
FIG. 8*a* is a side view of a generally U-shaped object to be produced stereolithographically.
Figure 8B:
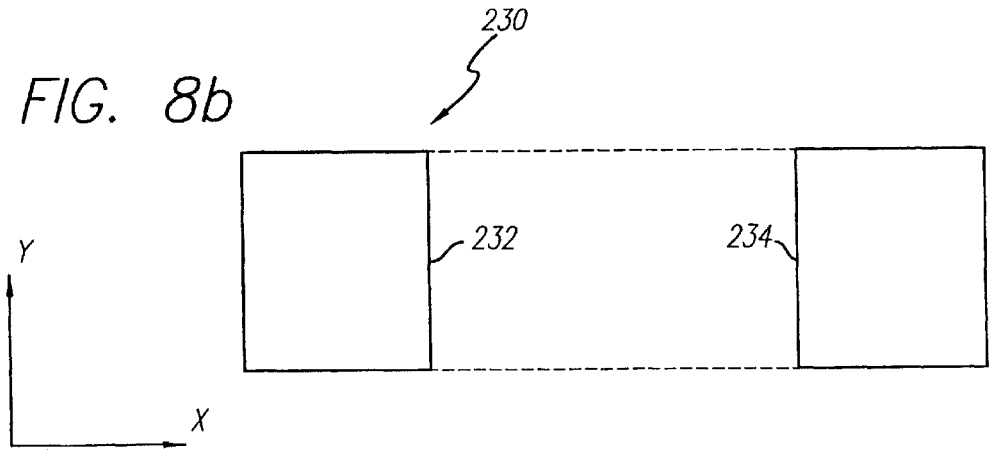
FIG. 8*b* is a section view taken along the lines 8*b*—8*b* of FIG. 8*a*.

Recognizing an object to contain more than one region is also useful for objects such as object 230 in FIGS. 8a and 8b. Regions 232 and 234 of object 230 may be treated as regions 224 and 226 of object 220, for the same benefits as shown above.

It should be understood that, for any object or objects, the delay for each region might be independently ensured. In other words, the time from completion of the first pass of each region until the start of the second pass for each region, respectively, could be at least as long as the desired delay. The first hatch pass for all regions would be followed by any remaining delay for the first region. Upon completion of this pass, any remaining delay for the second region would be followed by the second hatch pass of the second region. To minimize build time, it may be preferable to create regions that can be scanned in about the length of time similar to the length of the delay for each region.

Of course, it is not necessary to split an object into only two regions, and the regions do not need to be of equal size or shape. In instances where a platform has a variety of objects, it may be prudent to create multiple regions for less than all the objects on the platform, or for none of the objects. As splitting of contiguous object cross sections into two or more regions could introduce undesired markings on up-facing surfaces or other surfaces, it may be desirable to limit using of splitting to cross sectional regions which are one or more (e.g. two to five) layers below up-facing surfaces.

The Fifth Embodiment

The fifth preferred embodiment of the instant invention involves further minimization of build time. In this embodiment, the drawing speed and direction of the vectors on the first pass and second pass of each region and/or cross-sectional element are taken into consideration when calculating the delay period. In essence, each point is considered independently, and the order of scanning, and any scanning delays, are calculated to minimize build time while ensuring that at least a majority of twice-or-more-scanned points receive the proper delay between exposures.

Consider the simple square shaped object 240 in FIG. 9a and one of the object's laminae, as depicted in FIG. 9b. The first pass of hatch vectors begins at $B_1$ and ends at $E_1$. The second pass of hatch vectors begins at $B_2$. As the first vector of the second pass 244 is drawn, the most recently scanned vector it overlaps is vector 242. The point at which they intersect is point 246. The portion of vector 244 between the beginning of the vector and intersection point 246 is $BL_2$. The portion of vector 242 between the intersection point 246 and the end of the vector is $EL_1$.

The standard delay for this lamina would be

Time($B_2$)−Time($E_1$)=delay=15 seconds

Rather than delaying for 15 seconds between the points $E_1$ and $B_2$, build time may be saved by reducing the delay time by the amount of time it takes to draw $EL_1$, and $BL_2$, since Time($B_2$)−Time($E_1$)≧delay−Time($EL_1$)−Time(BL2)

Depending on the scan order and the length of the object and the vectors, the amount of time saved varies. For instance, the time saved for the lamina in FIG. 9c would be less than the time saved for the lamina in FIG. 9b, since the length of $EL_1$, is shorter in FIG. 9c. Similarly, the time saved for the lamina in FIG. 9d would be less than the time saved for the lamina in FIG. 9b or the lamina in FIG. 9c.

Figure 10A:
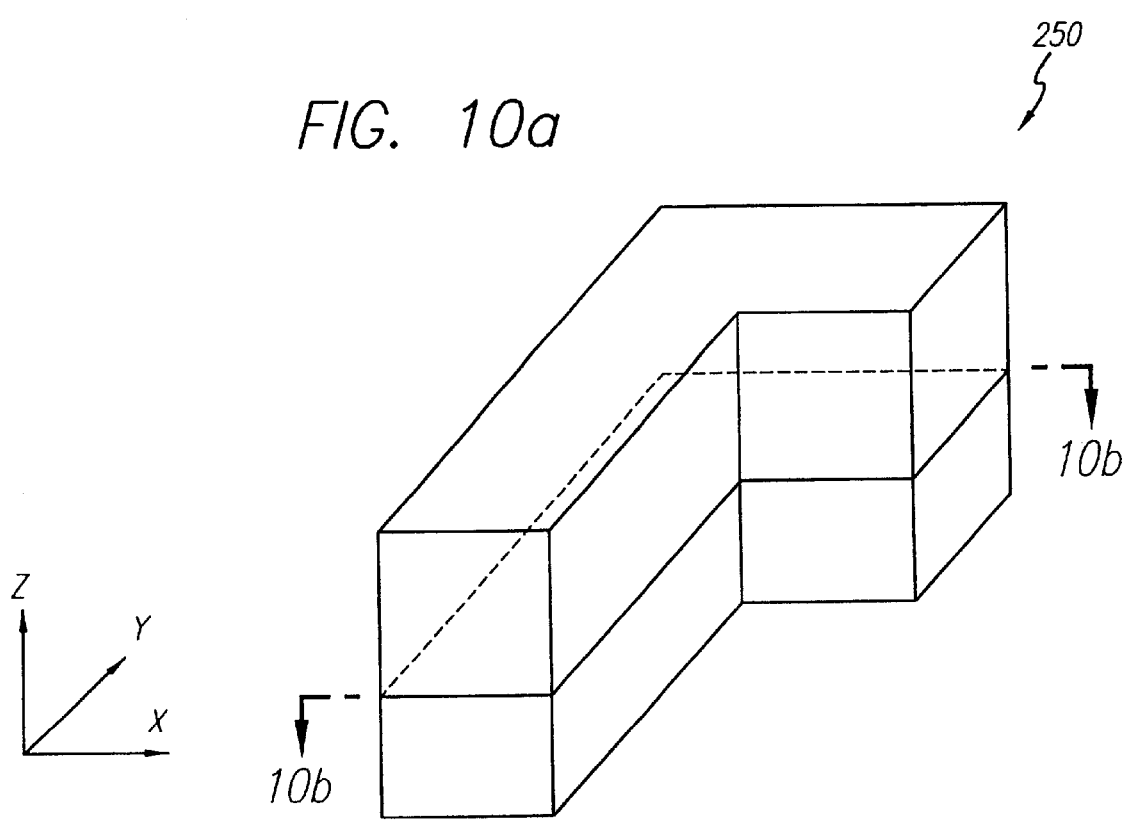
FIG. 10*a* is an oblique view of a generally L-shaped object to be produced stereolithographically.
Figure 10B:
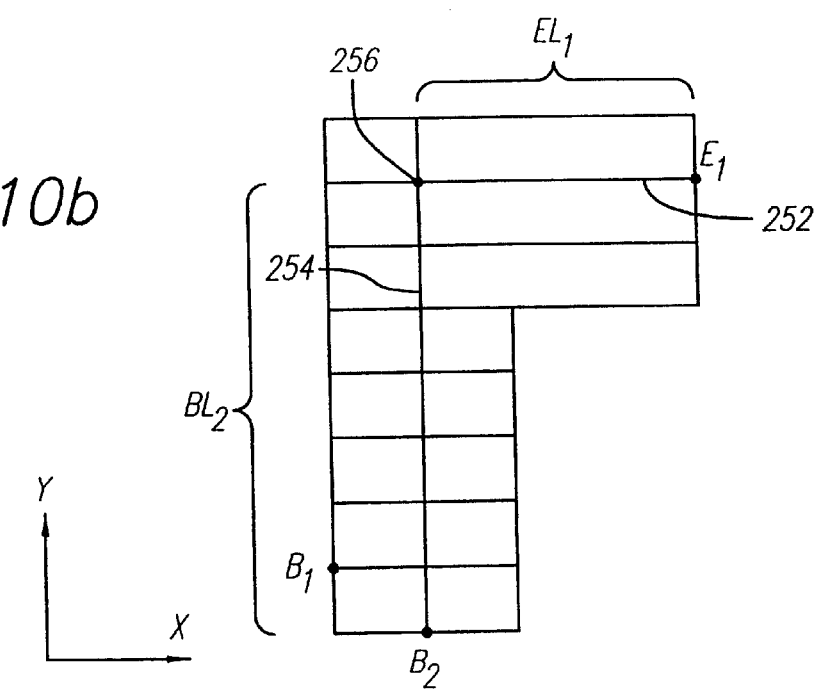

Now consider a slightly more complicated object 250 in FIGS. 10a and 10b. As in the previous examples, the first pass of hatch vectors begins at $B_1$ and ends at $E_1$ and the second pass of hatch vectors begins at $B_2$. As the first vector of the second pass 254 is drawn, the most recently scanned vector it overlaps is vector 252. The point at which they intersect is point 256. The portion of vector 254 between the beginning of the vector and intersection point 256 is $BL_2$. The portion of vector 252 between the intersection point 256 and the end of the vector is $EL_1$.

Once again, the time to scan $EL_1$ and $BL_2$ may be subtracted from the standard delay in order to minimize the time to complete this lamina.

If, however, the scan order was as shown in FIG. 10c, where the first pass begins at $B_1$ and ends at $E_1$, and the second pass begins at $B_2$ and ends at $E_2$, computing the optimized delay may be more complicated. To determine the delay necessary before scanning vector 268, the time to scan vectors 262, 263, 264, 265, and 266, plus the portion of vector 261 between 274 and the end of the vector, and the portion of vector 268 between $B_2$ and 274 should be subtracted from the standard delay.

In another implementation of this embodiment, this check would take place for each vector. For instance, before scanning vector 272, it may be necessary to pause if the time to scan vector 266 between 275 and $E_1$, plus the time to scan vectors 268, 269, 270, and 271, when subtracted from the standard delay, is greater than the delay used before scanning vector 268. Thus, this implementation may result in pausing one or more times during the second scan, so that the point on each vector of the second pass with the shortest calculated minimum time between scans can obtain the desired delay.

In yet another implementation of this embodiment, to ensure the desired delay for each twice-scanned point while ensuring the fastest possible scan time for the lamina, this calculation could be completed for each of these points, not just each vector. This may result in pausing one or more times during the second scan, in order for all the points to obtain the desired delay.

In a further alternative, instead of worrying about the delay for all cross sectional elements, it may be ensured that the delay is met for the first vector scanned during the second pass, not other vectors being scanned.

The Sixth Embodiment

In a preferred stereolithography system, the beam size for exposing at least some of the hatch vectors is preferably about 0.760 mm (0.030 inch) in diameter (for example, between 0.380 mm (0.015 inch) and 3.050 mm (0.120 inch), and more preferably between 0.500 mm (0.020 inch) and 1.524 mm (0.060 inch), the laser beam power is preferably about 800 mW (for example, 400 mW or greater), the spacing between successive hatch lines is preferably about 0.380 mm (0.015 inch) (for example, between 50 percent and 100 percent of the beam diameter), and the scanning speed is preferably about 7620 mm/sec (300 ips) (for example, 2540 mm/sec (100 ips) or greater).

In one preferred embodiment, the delay would be implemented according to the following procedure. A dual-sized beam would be used. The smaller beam would have a diameter of approximately 0.250 mm (0.010 inch), and the larger beam would have a diameter of approximately 0.760 mm (0.030 inch). The object would also be formed using a building technique where only portions of some layers are solidified in association with those layers, wherein the remaining portions of the layers would be formed in association with subsequent layers. Such techniques are described in U.S. Pat. No. 5,902,538, by Kruger, et al., U.S. Pat. No. 5,597,520 issued Jan. 28, 1997, to Smalley, et al, and U.S. Pat. No. 5,209,878 issued May 11, 1993, to Smalley, et al. In particular, the object would be formed using two secondary layers located between each primary layer, as described in the above noted U.S. Pat. No. 5,902, 538, and the separation between each layer would be 0.076 mm (0.003 inch).

Figure 12:
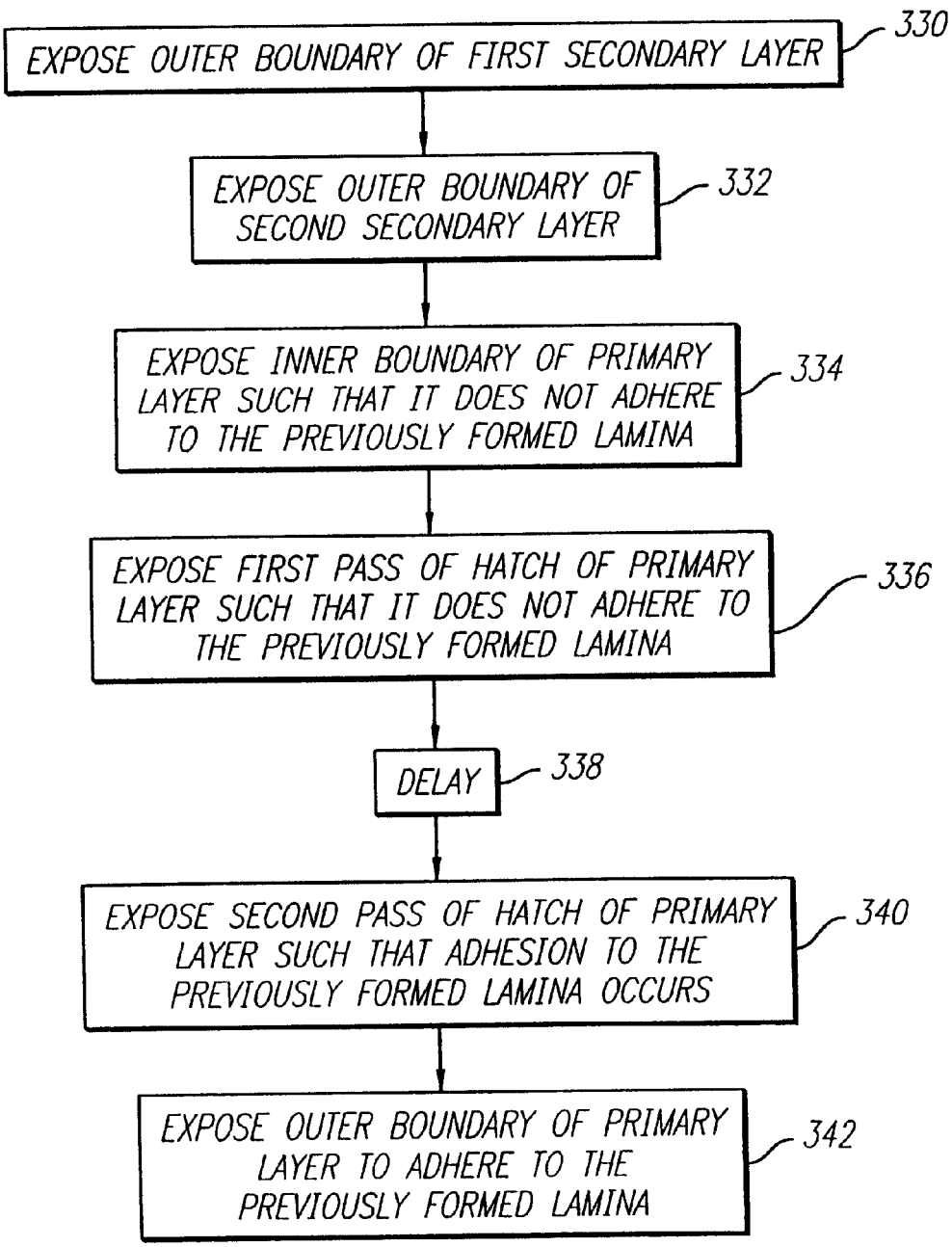
FIG. 12 is a flow chart depicting the sixth embodiment.

An implementation of the sixth embodiment is depicted in the flow chart of FIG. 12. On a first secondary layer, only an outer boundary region 330 would be formed, using the smaller beam. The exposure would result in a cure depth of approximately 0.380 mm (0.015 inch). This boundary may be line width compensated by about 0.127 mm (0.005 inch).

On a second secondary layer, again, only an outer boundary region 332 would be formed, using the smaller beam. This boundary may also have a cure depth of approximately 0.380 mm (0.015 inch) and be line width compensated by about 0.127 mm (0.005 inch).

The outer boundary regions of the secondary layers may alternatively be given a cure depth of less than approximately 0.300 mm (0.015 inch). The cure depth used may be dependent on the depth of liquid prior to exposure of the boundary regions. For instance, depending on whether or not the outer boundary region where the secondary layer overlays the boundary of the previously formed secondary layer, the depth of liquid prior to exposure may be equal to 0.076 mm (0.003 inch) or 0.152 mm (0.006 inch). Thus, as the depth of liquid prior to exposure varies it may be preferable to adjust the cure depth for these outer boundary regions.

The subsequent primary layer would be formed using the following steps. First, an inwardly offset boundary 334 would be formed, using the large beam. This boundary may be offset inward from the line width compensated outer boundary position by about 0.380 mm (0.015 inch). The beam would provide an exposure such that the boundary would not adhere to the layer below, but would be given a cure depth of approximately 0.200 mm (0.008 inch).

Second, a first pass of hatch 336 would be formed within the bounds of the solidified boundary region. This hatch would be supplied an exposure yielding a cure depth of approximately 0.200 mm (0.008 inch). This hatch may also be retracted slightly from the solidified boundary so that no adhesion to the boundary occurs, or alternatively, it may adhere to the boundary. This adhesion to the boundary could occur at all locations along the boundary or only a portion of the interface region.

Third, a delay period 338 of, for example, 15 seconds would occur. This delay time may be occupied by drawing other object regions or simply may be a wait period.

Fourth, a second exposure of hatch 340 is applied. This hatch is preferably oriented in a direction perpendicular to the direction of the first pass of hatch. The quantity of exposure applied on the second pass is that amount which would yield a cure depth of 0.250 mm (0.010 inch). As with the first exposure of hatch, it is preferred that the spacing between each hatch line is such that an overlapping exposure occurs, yielding a continuously solidified region. Any retraction associated with the second pass of hatch would preferably be similar to that used on the first pass, for example, 0.076 mm (0.003 inch).

The fifth step would be to use the small spot to expose an outer boundary 342 for the cross-sectional region. The exposure would result in a cure depth of approximately 0.380 mm (0.015 inch). This outer boundary would be line width compensated by approximately 0.125 mm (0.005 inch).

Depending on whether or not this boundary overlays the boundary on the previously formed secondary layer, the depth of liquid prior to exposure may be equal to 0.076 mm (0.003 inch) or 0.229 mm (0.009 inch). For a shallower depth of liquid prior to exposure, it may be preferable to decrease the cure depth for the outer boundary region.

With the fifth step of this process completed, the exposure of the primary layer is completed, or there may be additional exposure of hatch, and/or skin fill, and/or supports with the small spot following the small spot exposure of the outer boundary. In addition, there may be exposure of skin fill with the large spot after the second pass of hatch with the large spot, but before the exposure of the outer boundary with the small beam.

Once exposure of the primary lamina is accomplished, object formation continues with the repeated formation and exposure of two secondary layers followed by a primary layer until the object is completed. Further appreciation of object formation using secondary layers and primary layers can be gathered from a review of the U.S. patent application 08/920,428, filed Aug. 29, 1997, by Kruger, et al. referenced above.

The preceding technique is summarized in the table below, and is depicted in FIG. 11.

TABLE 7

Order of formation and exposure of layers 200, 202, and 204.

| Action | FIG. 11 Reference Number | FIG. 12 Reference Number |
|---|---|---|
| Form first secondary layer | 300 | |
| Draw boundary region of first secondary layer | 310 | 330 |
| Form second secondary layer | 302 | |
| Draw boundary region of second secondary layer | 312 | 332 |
| Form primary layer | 304 | |
| Draw inner boundary of primary layer using larger beam | 314 | 334 |
| Draw first pass of hatch of primary layer using larger beam | 316' | 336 |
| Delay occurs between the two passes of hatch of the primary layer | | 338 |

TABLE 7-continued

Order of formation and exposure of layers 200, 202, and 204.

| Action | FIG. 11 Reference Number | FIG. 12 Reference Number |
|---|---|---|
| Draw second pass of hatch of primary layer using larger beam | 316" | 340 |
| Draw outer boundary of primary layer using smaller beam | 318 | 342 |

The parameters used for the formation and exposure of layers 200, 202, and 204 appear in Table 8, below.

TABLE 8

Parameters used for formation and exposure of layers 200, 202, and 204.

| Parameter | Approximate Value Used |
|---|---|
| Layer Thickness, Primary and Secondary Layers | 0.076 mm (0.003 inch) |
| Boundary Cure Depth, Secondary Layers | 0.380 mm (0.015 inch) |
| Boundary Line Width Compensation, Secondary Layers | 0.127 mm (0.005 inch) |
| Inner Boundary Cure Depth, Primary Layer | 0.200 mm (0.008 inch) |
| Inner Boundary Offset from Line Width Compensated Outer Boundary, Primary Layer | 0.380 mm (0.015 inch) |
| First Hatch Pass Cure Depth, Primary Layer | 0.200 mm (0.008 inch) |
| First Hatch Pass Retraction from Inner Boundary, Primary Layer | 0.076 mm (0.003 inch) |
| Delay, Primary Layer | 15 seconds |
| Second Hatch Pass Cure Depth, Primary Layer | 0.250 mm (0.010 inch) |
| Second Hatch Pass Retraction from Inner Boundary, Primary Layer | 0.076 mm (0.003 inch). |
| Outer Boundary Cure Depth, Primary Layer | 0.380 mm (0.015 inch) |
| Outer Boundary Line Width Compensation, Primary Layer | 0.125 mm (0.005 inch) |

In one alternative to this embodiment, it is possible to use the teachings above with a single beam-width laser. Some adjustments may be necessary in order to use the above teachings with a single width beam, for instance, the inner boundary offset may preferably be decreased somewhat if the single beam width used were similar to the smaller beam width used in the embodiment. On the other hand, if the single beam width laser used was similar to the wider of the two beams from the present embodiment, it may be preferable to increase the outer boundary line width compensation value. Other necessary adjustments will be obvious to one of skill in the art.

A second alternative to the above embodiment would cure more than one layer in series according to the teachings above for the primary layer (i.e. secondary layers will not exist). Once again, it may be necessary to adjust certain parameters from the above teaching to effectively utilize this alternative. For example, if the layer thickness for each of these layers were 0.076 mm (0.003 inch), it would be preferable to adjust the cure depth for the first hatch pass to approximately 0.050 mm (0.002 inch). Other necessary adjustments will be evident to those of skill in the art.

While several embodiments have been described and illustrated and many alternatives proposed, upon review of the teachings herein, it will be apparent to those skilled in the art that various modifications are possible without departing from the spirit and scope of the invention. As such, the embodiments herein are not intended to limit the scope of the invention, but instead to be exemplary in nature.

For example, in some alternative embodiments, useful delay times may be empirically determined for a given building material and exposure style. The geometry of the object, and especially of the last formed lamina, may also play a role in selecting appropriate delay times. For cross-sections that may be as large as 20 inches by 20 inches, preferred delay times may range from 1 second to 60 second or more. More preferred delay times may be approximately 5 seconds to 30 seconds and most preferred delay times may be about 10 to 20 seconds.

The most useful delay times may be those that allow a desired amount of shrinkage to occur prior to application of the second exposure. Alternatively, these useful delay times may be such as to delay further exposure that may connect an exposed region of a lamina to solidified material that is adhered to the previous lamina.

In some preferred embodiments, the desired amount of shrinkage may be defined as that which maintains curl distortion below a desired limit. The extent of curl may be measured using a diagnostic object that includes a cantilevered section extending 14 mm in length, having a width of 3 mm, and having a height of 6 mm. The extent of curl may be defined as the ratio of the cantilever's height at its unsupported end to its height at its supported end, for a given cantilever length. In some preferred embodiments preferred levels of curl are less than 1%, more preferred levels are less than 0.1%, and most preferred levels are less tan 0.01%. Techniques for measuring curl distortion are provided in previously referenced U.S. Pat. No. 5,104,592 issued Apr. 14, 1992, to Hull, et al. Delay times may be derived.

For large objects, the extent of the delay may be based on forming lines of solidified material of desired length (e.g. similar to the dimensions of the objects that will be formed), of desired cure depth (e.g. similar to the cure depth to be used during the first pass over the hatch or fill region that will be used in forming objects), and with desired scanning speeds (e.g. similar to the speeds that will be used during object formation). One end of the line may be fixed in position and the other end of the line may be observed as a function of time. As time passes, the free end of the line will move towards the fixed end as shrinkage progresses. From formation of a series of such floating lines, an extent of shrinkage may be ascertained and/or the time it takes for shrinkage to occur may be ascertained. In some preferred embodiments, the selected delay will be equal to or greater than the time required for 70% of the shrinkage to occur, more preferably the time required for 85% of the shrinkage to occur, and most preferably for 95% of the shrinkage to occur.

Delay times may be measured by the passing of time on a clock, by the passing of time as derived from some other physical process (e.g. scanning a length of the beam at a desired speed, time to perform other processes such as beam profiling, and the like), and/or by observing physical changes to the object being formed.

Though the above embodiments have been primarily described in terms of their implementation in systems that operate based on the selective solidification of photopolymerizable materials (the preferred system), it is believed that the data processing and object building techniques are applicable to other segments of the Rapid Prototyping and Manufacturing industry alone or in combination. These other segments include technologies involving the selective solidification of polymerizable material by use of IR, visible and other forms of radiation or by the selective deposition of a medium onto the material (e.g. a photoinitiator being dispensed onto a polymerizable material in a continuous or intermittent light environment or selective deposition of the second part of a two-part epoxy onto the first part). Also, technologies involved in the building of objects from selectively solidified powdered materials (e.g. by sintering or selective deposition of a reactive material or binding agent) are included in these segments. Furthermore, technologies utilizing the layer by layer build up of sheet material or the selective dispensing of a material that solidifies when dispensed into an appropriate environment (e.g. the technologies disclosed in U.S. Pat. No. 5,192,559 issued Mar. 9, 1993, to Hull, et al. and U.S. Pat. No. 5,141,680 issued Aug. 25, 1992, to Almquist, et al., which are incorporated herein by this reference) are included in these segments.

The above embodiments provide simplified techniques that can be used to form objects with less distortion than previously possible, and to form objects with less distortion than that reliably allowed when using high scan rates for solidifying the material. The above embodiments also maintain object accuracy while minimizing formation times, maintain temperature uniformity of objects during object formation, and can be used to form objects with faster scan rates than previously possible, while maintaining accuracy. These advantages may be achieved alone and in combination.

We claim:

1. A method for forming at least a portion of a three-dimensional object, comprising:
   a) forming a layer of fluid-like resin material over a previously formed lamina of the object;
   b) exposing the layer to stimulation to form a subsequent lamina of the object adhered to the previously formed lamina;
   c) repeating (a) and (b) to form the object from a plurality of adhered laminae; and
   d) defining a time period,
      wherein (b) comprises exposing at least one element in a subsequent lamina being formed in the layer with at least two exposures, wherein a first exposure is followed by a second exposure after a delay substantially equal to or greater than the defined time period, and wherein the first exposure is performed by a beam scanning in a first direction over the element and the second exposure is performed by the beam scanning in a second direction over the element, wherein the first and second directions are different, the delay is determined by a measured or calculated temperature of the resin material that defines an exposure delay time period.

2. The method of claim 1 wherein the first exposure and the second exposure are separated from one another by at least a third exposure of at least one element of the layer.

3. The method of claim 1 wherein the first exposure and the second exposure are consecutive.

4. The method of claim 1 wherein (b) includes the use of vector scanning.

5. The method of claim 1 wherein a minimum of the defined time period is defined by a minimum time from the time of exposure to the time the resin material reaches a desired temperature.

6. The method of claim 1 wherein a minimum of the defined time period is defined by the system software.

7. The method of claim 1 wherein the first exposure solidifies the material to a depth less than that necessary to cause adhesion to the previously formed lamina.

8. The method of claim 1 wherein the stimulation is UV radiation.

9. The method of claim 1 wherein the second exposure causes adhesion to the previously formed lamina.

10. A method for forming at least a portion of a three-dimensional object, comprising:
   a) forming a layer of fluid-like resin material over a previously formed lamina of the object;
   b) exposing the layer to stimulation to form a subsequent lamina of the object adhered to the previously formed lamina;
   c) repeating (a) and (b) to form the object from a plurality of adhered laminae; and
   d) defining a time period,
      wherein at least one lamina to be formed comprises at least two regions and (b) comprises exposing the layer with at least two exposures, wherein a first exposure exposes a first region and at least a second region, and the at least second exposure exposes a first region and at least second region, and wherein the time between the completion of the first exposure of at least one of the exposed regions and the beginning of the second exposure of the exposed region is a delay time substantially equal to or greater than the defined time period the defined time period being determined by a measured or calculated temperature of the resin material to define the time period.

11. The method of claim 10 herein the first exposure is performed by a beam scanning in a first direction, the second exposure is performed by a beam scanning in a second direction, and the first and second directions are different.

12. The method of claim 10 wherein (b) includes the use of vector scanning.

13. The method of claim 10 wherein a minimum defined time period is defined by a minimum time from the time of exposure to the time a resin reaches a desired temperature.

14. The method of claim 10 wherein a minimum defined time period is defined by the system software.

15. The method of claim 10 wherein the first exposure solidifies the material to a depth less than that necessary to cause adhesion to the previously formed lamina.

16. The method of claim 10 wherein the two regions are spatially separated.

17. The method of claim 10 wherein the two regions are contiguous.

18. An apparatus for forming at least a portion of a three-dimensional object, comprising:
   a coating system for forming a layer of fluid-like resin material over a previously formed lamina of the object;
   b) an exposure system for forming a subsequent lamina of the object adhered to the previously formed lamina;
   c) a computer programmed to operate (a) and (b) to form the object from a plurality of adhered laminae; and
   d) a computer programmed to utilize a defined time period,
      wherein (b) is operated to form at least one element of one layer with at least two exposures, wherein a first exposure is completed at a time $T_1$ and wherein a second exposure begins at a time $T_2$ and the difference between $T_1$ and $T_2$ is a delay time substantially equal to or greater than the defined time period, the defined period being determined by the temperature of the resin material to define an exposure delay time period.

19. The method according to claim 1 wherein the delay time is further determine by one or more of material resin type, cross-sectional area of the lamina, laser power, laser beam scan rate, laser beam size, laser profile and area exposure rate.

20. The method according to claim 1 wherein the delay time is further determined by one or more of material resin type, cross-sectional area of the lamina, laser power, laser beam scan rule, laser beam size, laser profile and area exposure rate.

21. The method according to claim 18 wherein the delay time is further determined by one or more of material resin type, cross-sectional area of the lamina, laser power, laser beam scan rate, laser beam size, laser profile and area exposure rate.

* * * * *